US011268605B2

(12) United States Patent
Iijima et al.

(10) Patent No.: US 11,268,605 B2
(45) Date of Patent: Mar. 8, 2022

(54) COMPOSITE GEAR, CARTRIDGE, IMAGE FORMING APPARATUS, MOLD, AND MANUFACTURING METHOD FOR COMPOSITE GEAR

(71) Applicant: CANON KABUSHIKI KAISHA, Tokyo (JP)

(72) Inventors: Gaku Iijima, Yokohama (JP); Tatsurou Fujii, Kawasaki (JP); Yuta Itahashi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/905,081

(22) Filed: Jun. 18, 2020

(65) Prior Publication Data

US 2020/0408295 A1 Dec. 31, 2020

(30) Foreign Application Priority Data

Jun. 27, 2019 (JP) .............................. JP2019-119939
Jun. 1, 2020 (JP) .............................. JP2020-095174

(51) Int. Cl.
*F16H 55/06* (2006.01)
*F16H 55/08* (2006.01)
(Continued)

(52) U.S. Cl.
CPC ....... *F16H 55/06* (2013.01); *B29C 45/14475* (2013.01); *F16H 55/082* (2013.01);
(Continued)

(58) Field of Classification Search
CPC .. F16H 55/06; F16H 55/082; F16H 2055/065; G03G 15/757; B29C 45/14475; B29L 2015/003
See application file for complete search history.

(56) References Cited

U.S. PATENT DOCUMENTS 3,180,171 A * 4/1965 Arpin ...................... F16H 55/06
74/460
3,652,814 A * 3/1972 Kanazawa ............. G04C 21/38
200/33 B
(Continued)

FOREIGN PATENT DOCUMENTS

JP H04-124628 U 11/1992
JP 2003-21224 A 1/2003
JP 2010-139041 A 6/2010

*Primary Examiner* — G. M. A Hyder
(74) *Attorney, Agent, or Firm* — Venable LLP

(57) ABSTRACT

A composite gear includes: a first member comprising a rotation shaft portion and a disk-shaped web extending in radial directions from the rotation shaft portion; and a second member comprising at least one engaging tooth on an outer periphery thereof and provided being supported by the web so as to surround an outer periphery of the first member. A space is provided between the second member and an outermost peripheral surface of the first member in a radial direction, a space is provided between the first member and an innermost peripheral surface of the second member in a radial direction, and at least one of the first member and the second member is formed to nip another of the first member and the second member from both sides thereof in an axial direction of the rotation shaft portion.

20 Claims, 23 Drawing Sheets

(51) Int. Cl.
  G03G 15/00 (2006.01)
  B29C 45/14 (2006.01)
  B29L 15/00 (2006.01)

(52) U.S. Cl.
  CPC ...... *G03G 15/757* (2013.01); *B29L 2015/003* (2013.01); *F16H 2055/065* (2013.01)

(56) References Cited

U.S. PATENT DOCUMENTS

| | | | | |
|---|---|---|---|---|
| 3,847,557 A | * | 11/1974 | Miller | B22D 13/04 428/580 |
| 4,702,122 A | * | 10/1987 | Richard | F16D 7/021 192/56.1 |
| 5,927,149 A | * | 7/1999 | Moody | F16H 55/14 74/443 |
| 6,053,060 A | * | 4/2000 | Tumberlinson | F02N 15/062 123/179.26 |
| 6,473,580 B1 | * | 10/2002 | Inomata | F16D 1/112 399/111 |
| 10,415,672 B2 | * | 9/2019 | Salisbury | F16H 1/321 |
| 2002/0043124 A1 | * | 4/2002 | Shiga | B29D 15/00 74/434 |
| 2008/0146402 A1 | * | 6/2008 | Shinohara | F16H 55/06 475/331 |
| 2009/0282939 A1 | * | 11/2009 | Rogowski | F16H 55/06 74/424.5 |
| 2012/0067151 A1 | * | 3/2012 | Kikuchi | F16H 55/06 74/425 |
| 2012/0216645 A1 | * | 8/2012 | Tanaka | B62D 5/0409 74/434 |
| 2015/0308555 A1 | * | 10/2015 | Oberle | F16H 55/17 74/421 R |
| 2019/0346035 A1 | * | 11/2019 | Iijima | B29C 45/162 |
| 2020/0217410 A1 | * | 7/2020 | Yamaguchi | F16H 1/20 |
| 2020/0256405 A1 | * | 8/2020 | Yasui | F16F 9/12 |
| 2021/0048022 B1 | * | 2/2021 | DeHoff | F04C 15/0061 |
| 2021/0114267 A1 | * | 4/2021 | Nakamura | B29C 45/1459 |

* cited by examiner

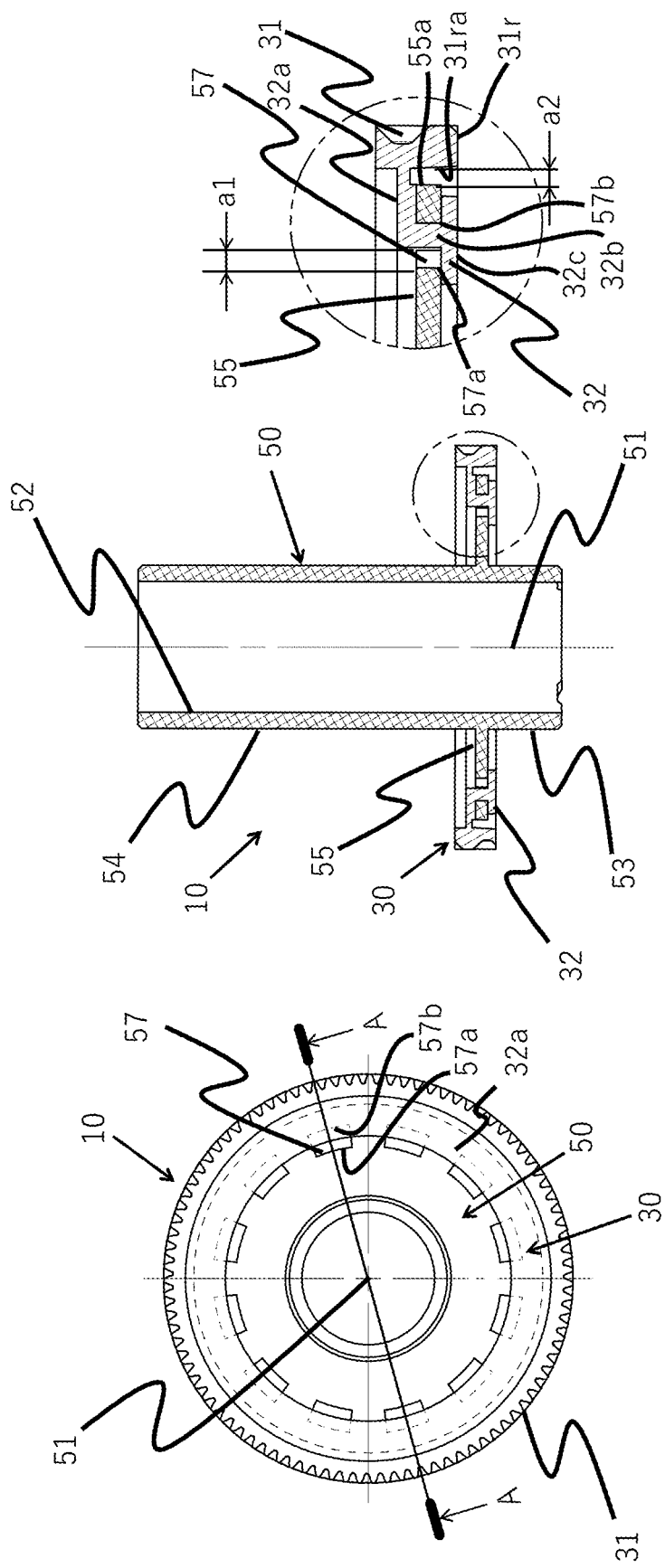

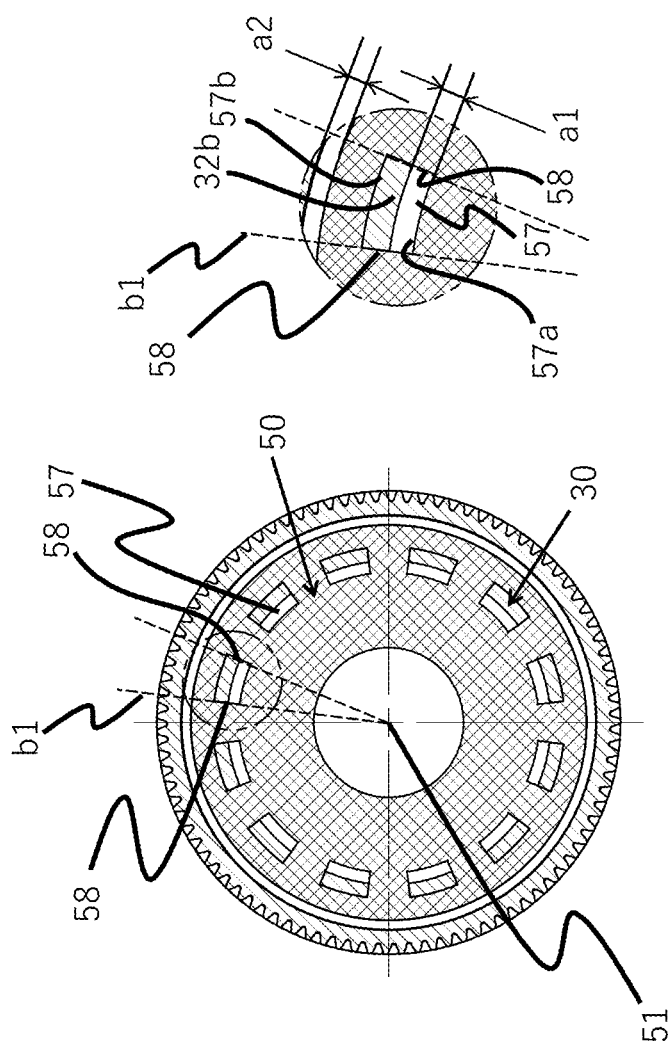
FIG.3C
FIG.3B
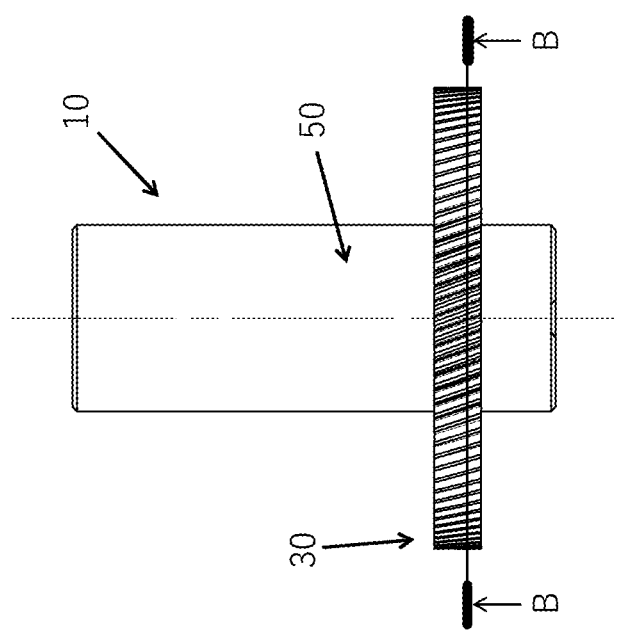
FIG.3A

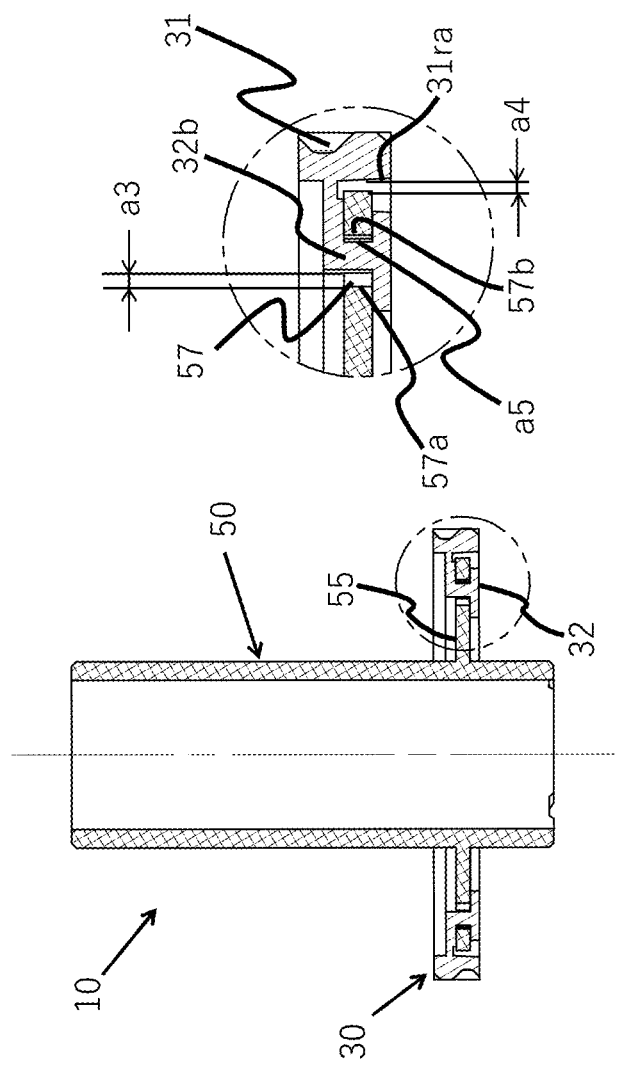
FIG.5C
FIG.5B
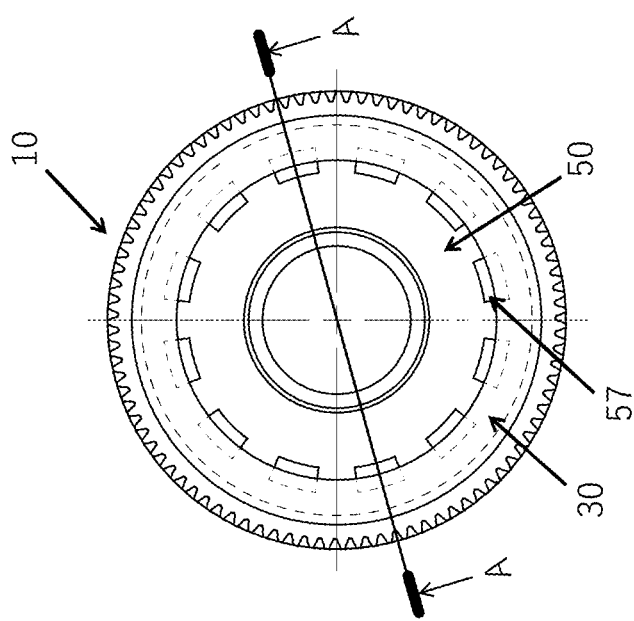
FIG.5A

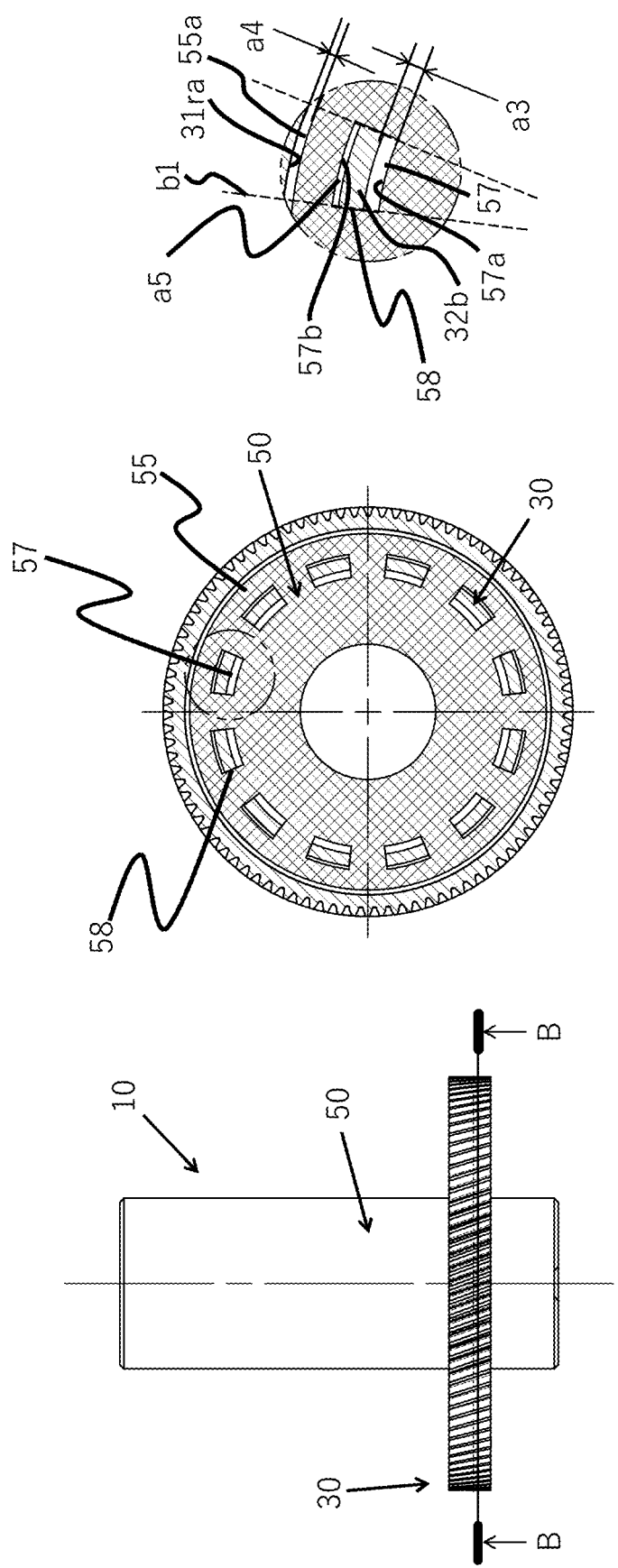

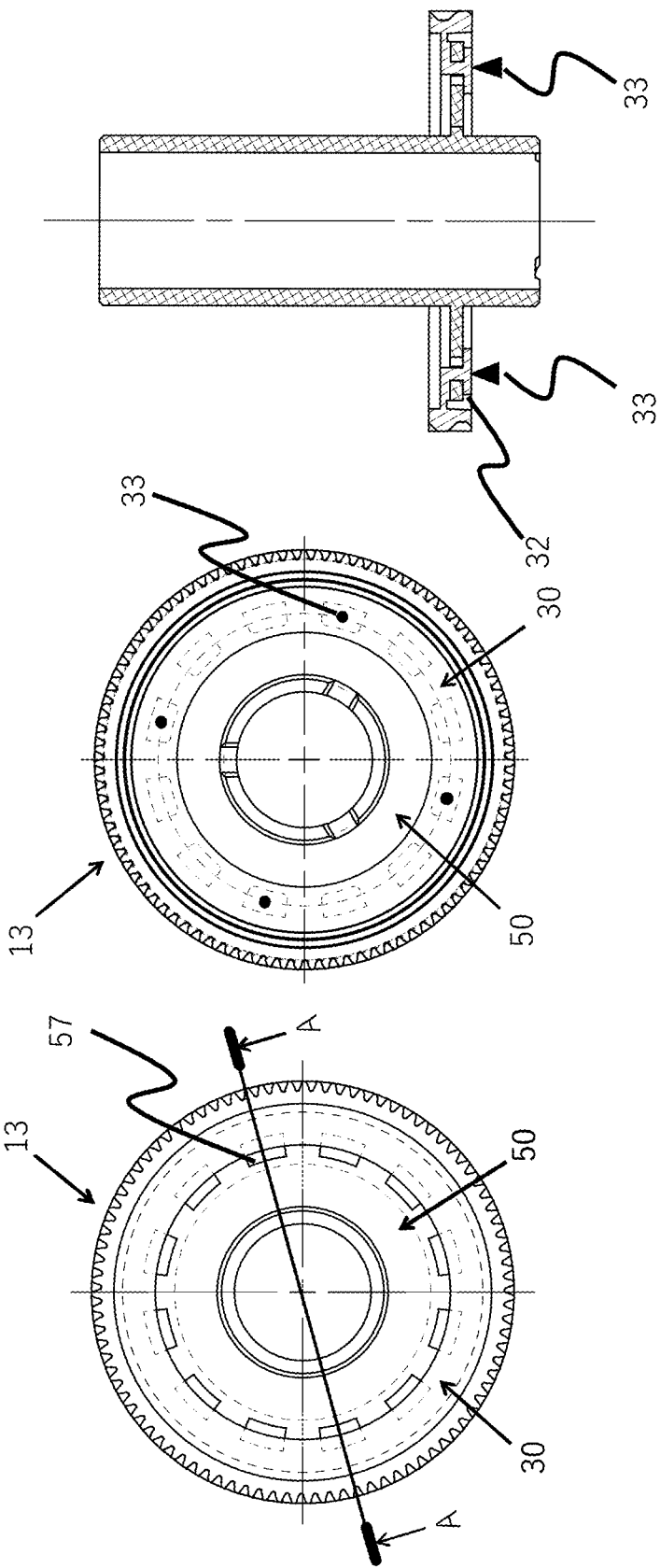

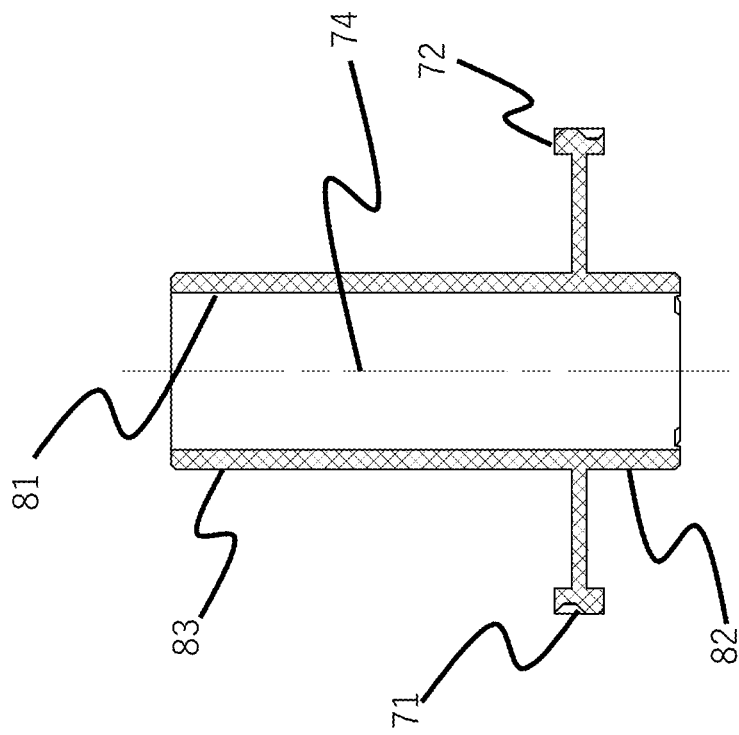
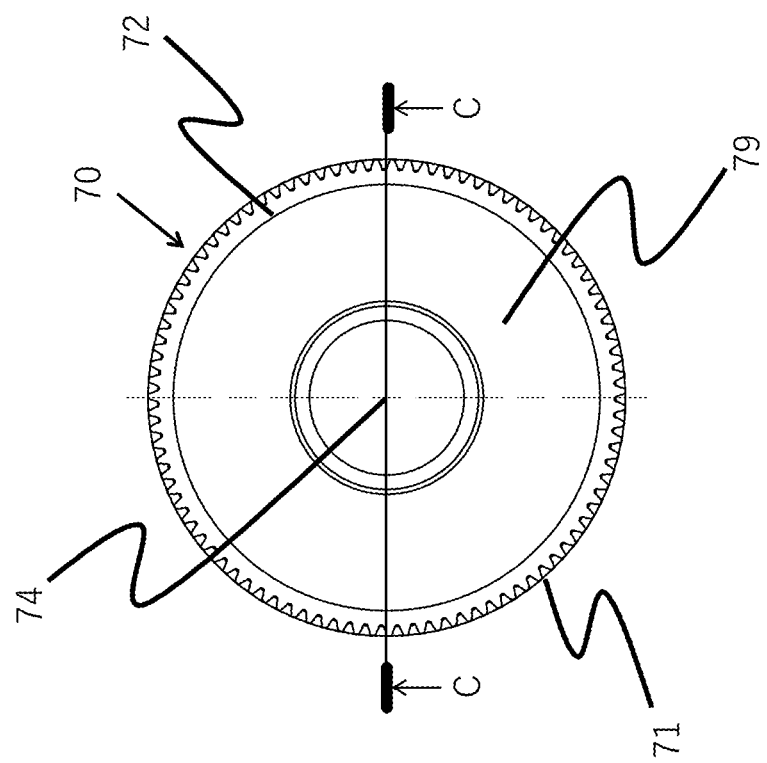
FIG.13A
FIG.13B

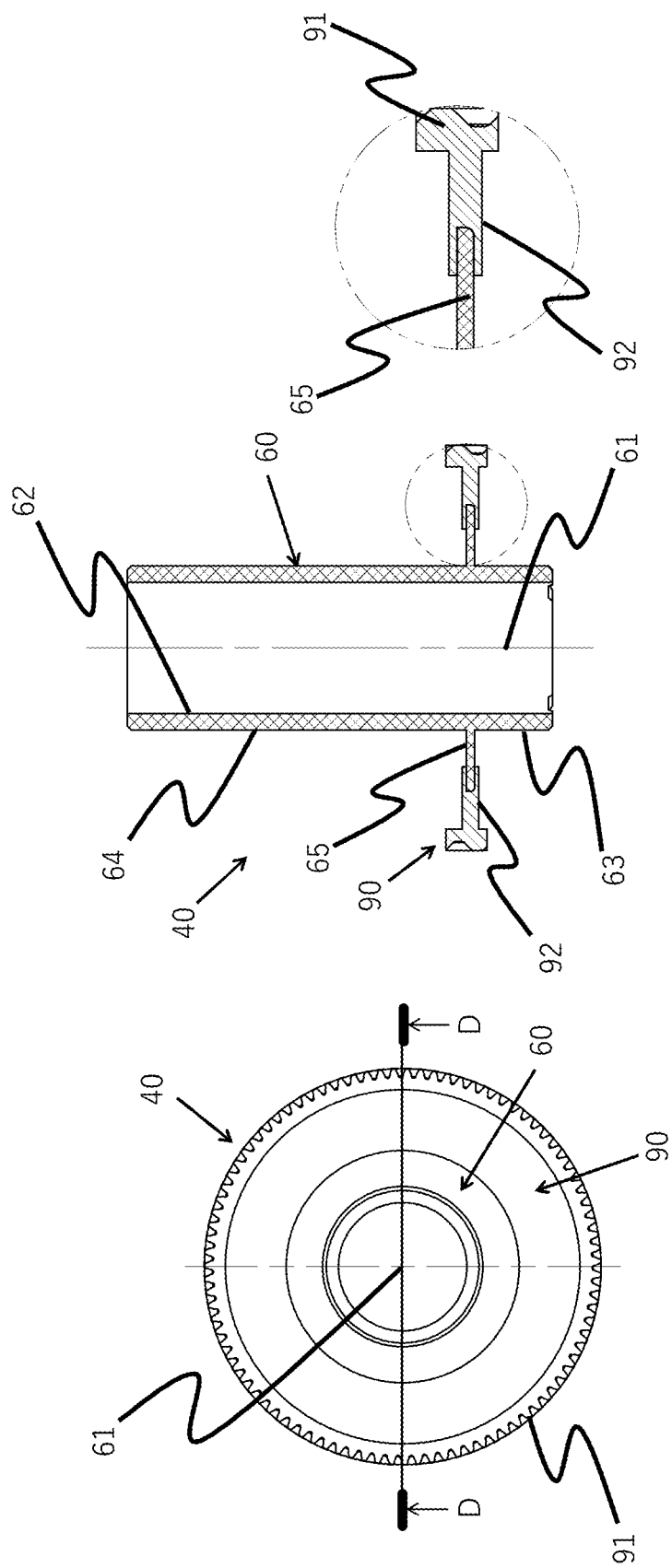

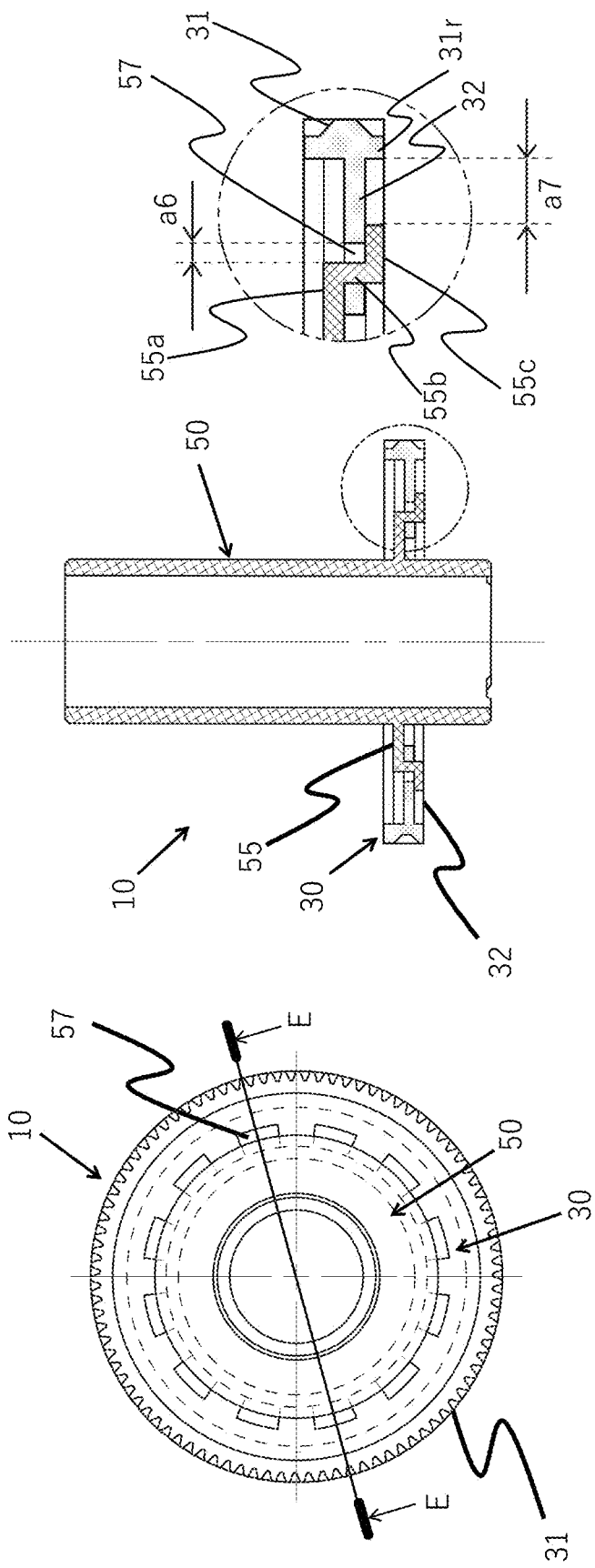

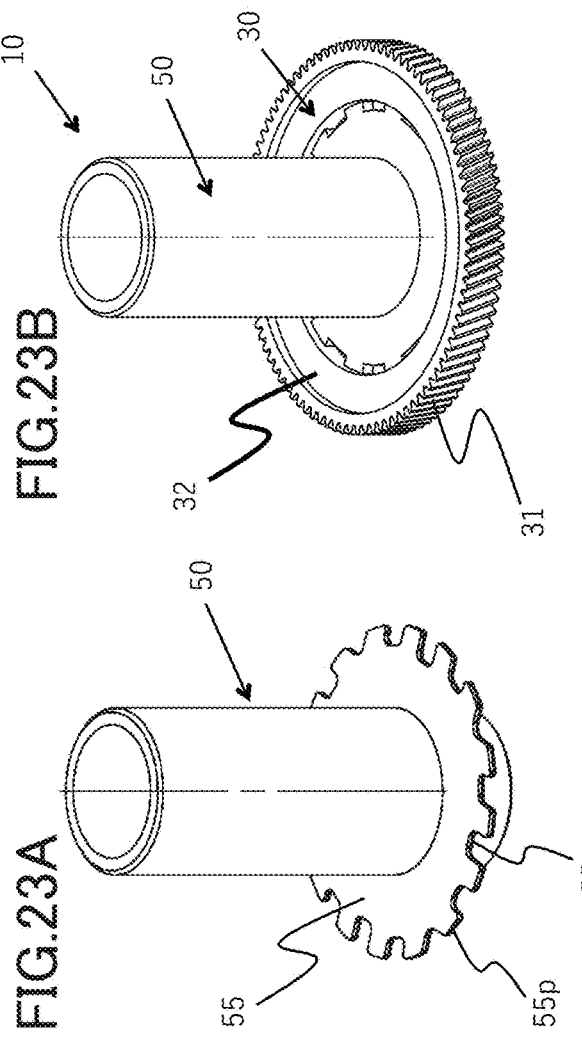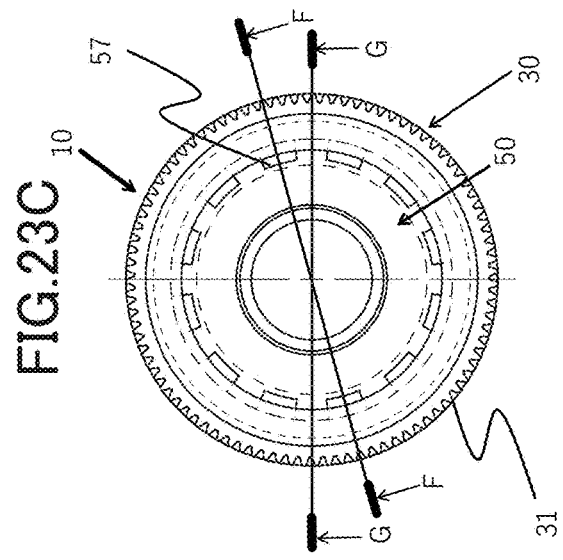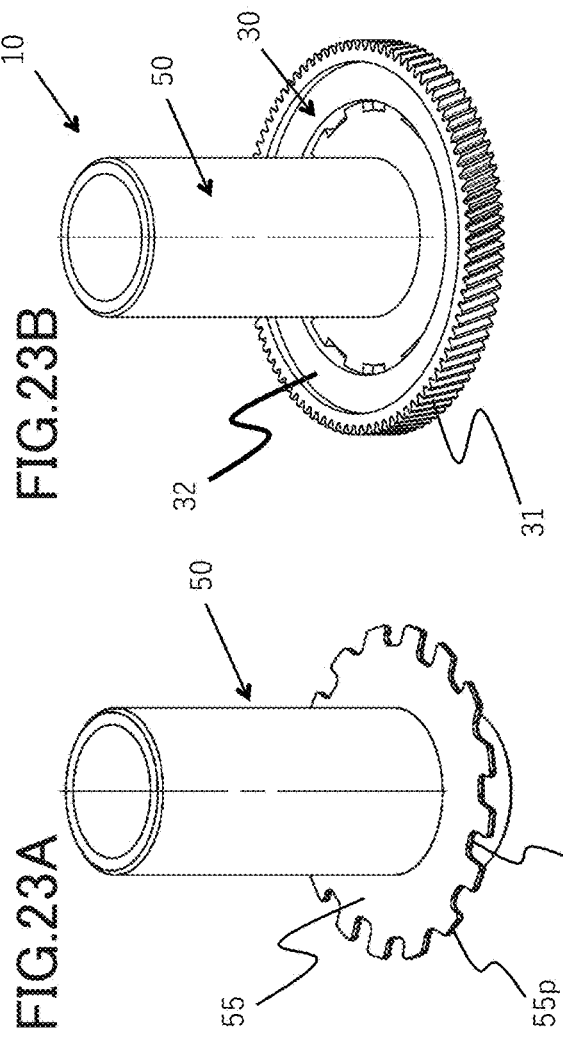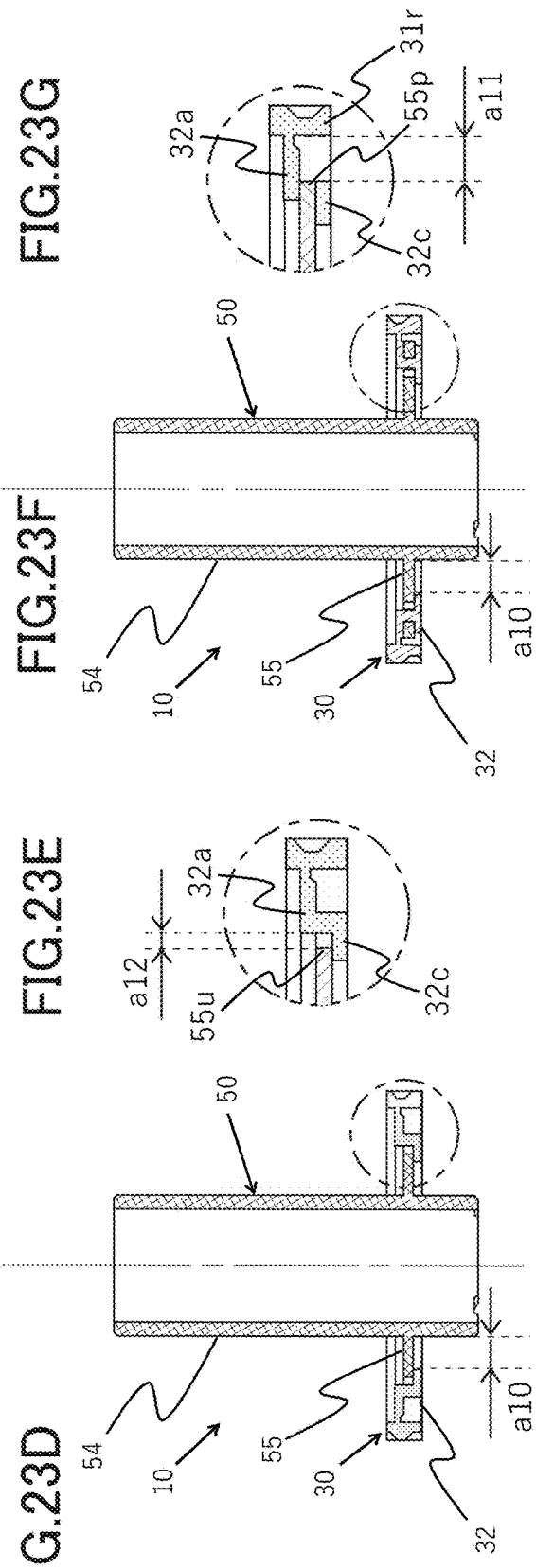

COMPOSITE GEAR, CARTRIDGE, IMAGE FORMING APPARATUS, MOLD, AND MANUFACTURING METHOD FOR COMPOSITE GEAR

BACKGROUND OF THE INVENTION

Field of the Invention

The present invention relates to a composite gear, a cartridge, an image forming apparatus, a mold, and a manufacturing method for a composite gear.

Description of the Related Art

A gear formed from resin is, as a power transmission component, incorporated in a wide variety of machine products, for example, office appliances such as copiers and printers, expendable supplies such as ink cartridges, and small precision devices such as digital cameras and video cameras. Conventionally, precision standards for resin gears as high-precision power transmission parts on tip form dimensions, deviation of path of contact (Japan Gear Manufacturers Association standard JGMA 116-02), and helix classification (Japanese Industrial Standards JIS B 1702 based on ISO 1328) are set in accordance with the use and purpose thereof. Particularly, for many resin gears used for high-quality machine products, the range of the precision standards are set to be narrow so as to improve the quality of the products.

However, in recent years, for color printers and copiers, demand for not only high quality but also improvement in functionality such as low noise during operation and advancement of printing performance has been rising. In the case of these devices, it is difficult to meet the demand by just the conventional method of setting the range of precision standard of gears to be narrower, and dynamic precision of gears such as rotation transmission precision (JIS B 1702-3 Appendix 1) needs to be improved.

For example, in the case of helical gears having inclined teeth, problems such as (1) error in the precision of flanks of gear teeth, (2) error of gear supporting portion, and (3) deformation of gears during rotation are known as events that degrade the rotation transmission precision.

Among these problems, (1) is considered to be caused by irrelevance of the specification given to the flanks to the use environment or deterioration of shape caused by shrinkage of resin at the time of molding. (2) is considered to be caused by eccentricity or inclination of a support shaft of the gear with respect to the rotation shaft. (3) is considered to be caused by torque or the like generated when actually incorporating the gear into a machine product and rotating the gear at a specific rotation speed. The cases of (1) and (2) described above can be managed by setting various standards such as helix deviation precision (JIS B 1702) and concentricity for gears and employing gears meeting the standards. In contrast, (3) is a problem that arises depending on the dynamic environment of gears, and therefore is sometimes hard to avoid by setting precision standards in static environments like in the cases of (1) and (2).

For example, a resin gear 70 illustrated in FIGS. 13A and 13B includes a ring-shaped rim 72 on which inclined teeth 71, that is, helical teeth are formed, a rotation supporting portion 74 provided in the center of the gear, and a web 79 connecting the rotation supporting portion 74 to the inclined teeth 71. The rotation supporting portion 74 has a cylindrical shape, and includes an inner wall portion 81 and outer wall portions 82 and 83. The structure of the rotation supporting portion differ depending on the configuration of the machine product, and examples thereof include a configuration of supporting the gear by fitting a resin or metal shaft in the inner wall portion 81 and a configuration of supporting the gear by using the outer wall portion 82 and/or the outer wall portion 83 as bearing.

Normally, when the resin gear 70 having the configuration described above is rotationally driven, torque is generated and thus torsion moment is generated in the rotation supporting portion 74. In addition, in the case where the resin gear 70 includes the inclined teeth 71, a component force in a thrust direction is generated by a torsion component of the teeth. That is, a plurality of force components are generated around the rotation supporting portion 74.

Conventionally, resin gears of this kind have been formed from resin materials such as polyacetal having high slidability and high mechanical strength. However, accompanied by improvement in the functionality of machine products in recent years, force applied to resin gears has increased, and problems of deformation of rotation supporting portions caused by increase in the load thereon often arise. Therefore, in recent years, a composite gear whose rotation supporting portion is formed from a synthetic resin having high rigidity and whose gear portion is formed from a conventional material such as polyacetal has been proposed.

For example, FIGS. 14A to 15C illustrate a conventional configuration of a composite gear 40 formed from two kinds of materials. This composite gear 40 is constituted by a first member 60 illustrated in FIG. 14A including a rotation supporting portion 61 formed from a synthetic resin having high rigidity, and a second member 90 illustrated in FIGS. 14A and 15A to 15C including a teeth portion 91. The second member 90 is formed from a synthetic resin softer than the first member 60, and is integrated with the first member 60 so as to cover (or, surround) the outer periphery of the first member 60.

In the composite gear 40 illustrated in FIGS. 14A to 15C, the rotation supporting portion 61 of the first member 60 includes an inner hole 62 and outer wall portions 63 and 64. In addition, an inner web 65 covered by the second member 90 is provided on the outer peripheral side of the rotation supporting portion 61. In the second member 90, an outer web 92 is provided so as to cover the inner web 65 as illustrated in FIGS. 15B and 15C. As described above, by forming the first member 60 from a highly-rigid material, deformation caused by torsion moment or a thrust component force generated at the time of rotation driving can be suppressed, and thus the problem (3) described above can be suppressed as much as possible. Further, by forming the second member 90 from a highly-slidable synthetic resin, rotation lubricity required for a gear can be obtained.

In the composite gear 40 having such a configuration, the rotation supporting portion of the first member 60 and the gear portion of the second member 90 must be strongly coupled to each other. Conventionally, a manufacturing method of manufacturing the first member 60 and the second member 90 separately and then combining the two by fastening or press-fitting has been sometimes used. However, according to this method, there is a problem that the precision is likely to be degraded by an assembly error and that more apparatuses, components, labor force, and time are needed for manufacture.

Therefore, as a different manufacturing method, a method of inserting a first member in a mold and performing injection molding of the second member to bring the two members into complete firm contact has been proposed. According to this method, since the first member and the second member can be peeled off from each other unless the two are compatible with each other, a structure in which the first member is nipped by the second member as in the composite gear illustrated in FIGS. 14A to 15C is employed. In addition, in order to suppress phase deviation caused by torque generated at the time of rotation, adhesion strength in the rotation direction is also secured by adding recess/projection portions 67 on the outermost periphery of the inner web 65 of the first member 60. Anyhow, a composite gear of this kind needs adhesion strength in both the thrust direction and the rotation direction.

For example, Japanese Patent Laid-Open No. 2010-139041 proposes a configuration in which a teeth portion formed from a synthetic resin is integrally formed on the outer periphery of an insert member including grooves in the axial direction so as to achieve high rigidity and high precision simultaneously. In addition, Japanese Patent Laid-Open No. 2003-21224 proposes a configuration in which a disk portion provided with recess/projection portions is provided on a rotation shaft, a gear is formed to cover the entirety of this disk portion, and thus the adhesion strength between the rotation shaft and the gear is enhanced. In addition, Japanese Utility Model Laid-Open No. H4-124628 proposes a configuration in which rigidity is secured by engaging projection portions provided on a side surface of a resin gear with hole portions provided in a side surface of a metal plate.

However, for a composite gear formed from a plurality of different kinds of materials as described above, problems of occurrence of cracks due to change in dimensions become more likely to arise as the coupling between members becomes stronger. In products of this kind, a gear portion is often manufactured from crystalline resin having high slidability such as polyacetal. For example, while slidability can be easily achieved with crystalline resin such as polyacetal, the amount of shrinkage thereof over time is large because crystallization of molecules therein progresses even after the molding. Therefore, there is a tendency that distortion occurs in a composite gear including a gear portion formed from this kind of crystalline resin due to difference in the amount of shrinkage. For example, in a composite gear illustrated in FIGS. 14A to 15C, sometimes a fiber-reinforced resin such as polybutadiene terephthalate is used for the first member 60 constituting a rotation shaft portion, and polyacetal resin is used for the second member 90. In this case, whereas the shrinkage factor of the polyacetal resin is 1.6% to 2.0%, the shrinkage factor of a fiber-reinforced resin such as polybutadiene terephthalate is about 0.2% to 0.8%, which is a big difference. Therefore, in the structure of FIGS. 14A to 15C, since the outer web 92 of the second member 90 is formed to cover the inner web 65 of the first member 60, a relationship in which the first member 60 hinders shrinkage of the second member 90 is established. Further, according to the selection of materials as described above, since the second member 90 has lower mechanical strength than the first member 60, distortion in the second member 90 increases and a crack can occur when shrinkage progresses over time.

Normally, since shrinkage over time progresses relatively slowly at a normal temperature in a living environment, it takes several tens to several hundreds of years to cause a crack, and therefore the possibility of occurrence of this problem is low. However, in a device including a gear, the gear is used in an environment of a high temperature in some case. In this case, the shrinkage over time is accelerated, and a crack can occur in several years.

Japanese Patent Laid-Open No. 2010-139041 described above proposes a configuration in which a teeth portion formed from a synthetic resin is integrally formed on the outer periphery of an insert member provided with grooves in the axial direction to achieve high rigidity and high precision simultaneously, but does not provide a measure to suppress the distortion caused by shrinkage difference between the two materials.

Japanese Patent Laid-Open No. 2003-21224 proposes a configuration in which a disk portion provided with recess/projection portions is provided on a rotation shaft, a gear is formed to cover the entirety of the disk portion, and thus adhesion strength between the rotation shaft and the gear is enhanced, but does not provide a measure to suppress the distortion caused by shrinkage difference, either.

In addition, Japanese Utility Model Laid-Open No. H4-124628 proposes a configuration in which rigidity is secured by engaging projection portions provided on a side surface of a resin gear with hole portions provided in a side surface of a metal plate. Further, Japanese Utility Model Laid-Open No. H4-124628 discloses suppressing cracks caused by shrinkage over time by setting clearance in engagement portions between the projection portions and the hole portions. However, the metal plate for securing the rigidity is just provided on one side surface of a resin material flat surface portion, and it is hard to say that the metal plate is strongly coupled to the resin material in the thrust direction. Therefore, combined with the effect of the clearance, there is a possibility that the two are separated from each other during use. As described above, according to conventional techniques, it has been difficult to achieve both of securing a coupling force between the two members and suppressing cracks caused by shrinkage difference in the case of forming a gear from two members formed from different kinds of materials.

SUMMARY OF THE INVENTION

The present invention provides a composite gear, a cartridge, an image forming apparatus, a mold, and a manufacturing method for a composite gear that can reduce possibility breakage such as cracks caused by shrinkage over time.

According to one aspect of the invention, a composite gear includes: a first member including a rotation shaft portion and a disk-shaped web extending in radial directions from the rotation shaft portion; and a second member including at least one engaging tooth on an outer periphery thereof and provided being supported by the web so as to surround an outer periphery of the first member. A space is provided between the second member and an outermost peripheral surface of the first member in a radial direction, a space is provided between the first member and an innermost peripheral surface of the second member in a radial direction, and at least one of the first member and the second member is formed to nip another of the first member and the second member from both sides thereof in an axial direction of the rotation shaft portion.

According to another aspect of the invention, a mold for manufacturing a composite gear is provided. The composite gear includes: a first member including a rotation shaft portion and a disk-shaped web extending in radial directions from the rotation shaft portion; and a second member including at least one engaging tooth on an outer periphery thereof and provided being supported by the web so as to surround an outer periphery of the first member. A space is provided between the second member and an outermost peripheral surface of the first member in a radial direction, a space is provided between the first member and an innermost peripheral surface of the second member in a radial direction, and at least one of the first member and the second member is formed to nip another of the first member and the second member from both sides thereof in an axial direction of the rotation shaft portion. The mold includes a first fixed mold, a second fixed mold, and a movable mold. The first member is molded in a state in which the movable mold opposes the first fixed mold. The second member is molded to be integrated with the first member in a state in which the movable mold has moved to a position opposing the second fixed mold after the first member has been molded.

According to still another aspect of the invention, a manufacturing method for a composite gear is provided. The manufacturing method including: a first step of forming a first member including a rotation shaft portion and a disk-shaped web extending in radial directions from the rotation shaft portion; and a second step of accommodating the first member formed in the first step in a mold and forming a second member including at least one engaging tooth on an outer periphery thereof such that the second member is supported by the web and surrounds an outer periphery of the first member. In the second step, the second member is formed such that a space is provided between the second member and an outermost peripheral surface of the first member in a radial direction, a space is provided between the first member and an innermost peripheral surface of the second member in a radial direction, and at least one of the first member and the second member is formed to nip another of the first member and the second member from both sides thereof in an axial direction of the rotation shaft portion.

Further features of the present invention will become apparent from the following description of exemplary embodiments with reference to the attached drawings.

BRIEF DESCRIPTION OF THE DRAWINGS

FIGS. 2A to 2C are each an explanatory diagram illustrating a configuration of the composite gear according to the exemplary embodiment.

FIGS. 3A to 3C are each an explanatory diagram illustrating a configuration of the composite gear according to the exemplary embodiment.

FIGS. 5A to 5C are each an explanatory diagram illustrating the composite gear according to the exemplary embodiment in a state after shrinkage.

FIGS. 6A to 6C are each an explanatory diagram illustrating the composite gear according to the exemplary embodiment in a state after shrinkage.

FIGS. 9A to 9C are each an explanatory diagram illustrating positions of gate traces of a composite gear according to Example 4.

FIGS. 13A and 13B are each an explanatory diagram illustrating a configuration of a conventional gear formed from one kind of synthetic resin.

FIGS. 15A to 15C are each an explanatory diagram illustrating a configuration of a conventional composite gear.

FIGS. 21A to 21C are each an explanatory diagram illustrating a modification example of the composite gear according to the exemplary embodiment.

FIGS. 23A to 23G are each an explanatory diagram illustrating a modification example of the composite gear according to the exemplary embodiment.

DESCRIPTION OF THE EMBODIMENTS

Exemplary embodiments of the present invention will be described below with reference to attached drawings. To be noted, the configurations described below are mere examples, and for example, details thereof can be appropriately modified by one skilled in the art within the scope of the present invention. In addition, numerical values mentioned in the present exemplary embodiment are examples of numerical values that can be set.

Figure 1A:
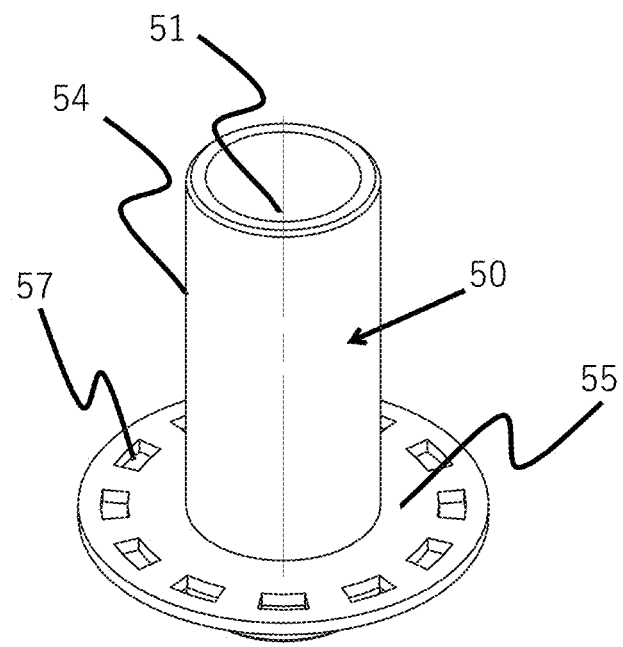
FIG. 1A is a perspective view of a first member constituting a rotation shaft portion of a composite gear according to an exemplary embodiment.
Figure 1B:
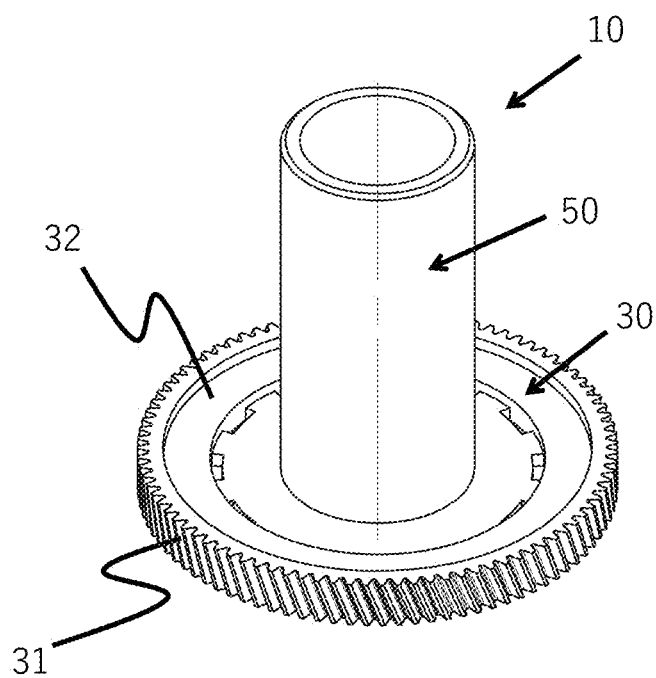
FIG. 1B is a perspective view of the composite gear according to the exemplary embodiment including a second member including engaging teeth on the outer periphery thereof.

FIGS. 1A to 4B illustrate a configuration of a composite gear and a configuration of a mold for forming the composite gear of the present exemplary embodiment. Among these, FIGS. 1A to 3C illustrate a configuration of a composite gear 10 of the present exemplary embodiment. FIG. 1A illustrates, in perspective view, a first member 50 constituting a rotation shaft portion of the composite gear 10 illustrated in FIG. 1B. FIG. 2B is a section view taken along a line A-A of FIG. 2A, which is a top view of the composite gear 10, and illustrates a section parallel to a center axis of a rotation supporting portion 51 of the composite gear 10. FIG. 2C illustrates a detailed sectional structure of a portion encircled by one-dot chain line in FIG. 2B. FIG. 3B is a section view taken along a line B-B of FIG. 3A, which is a side view of the composite gear 10, and illustrates a detailed sectional structure of a portion encircled by one-dot chain line in FIG. 3B.

Figure 18:
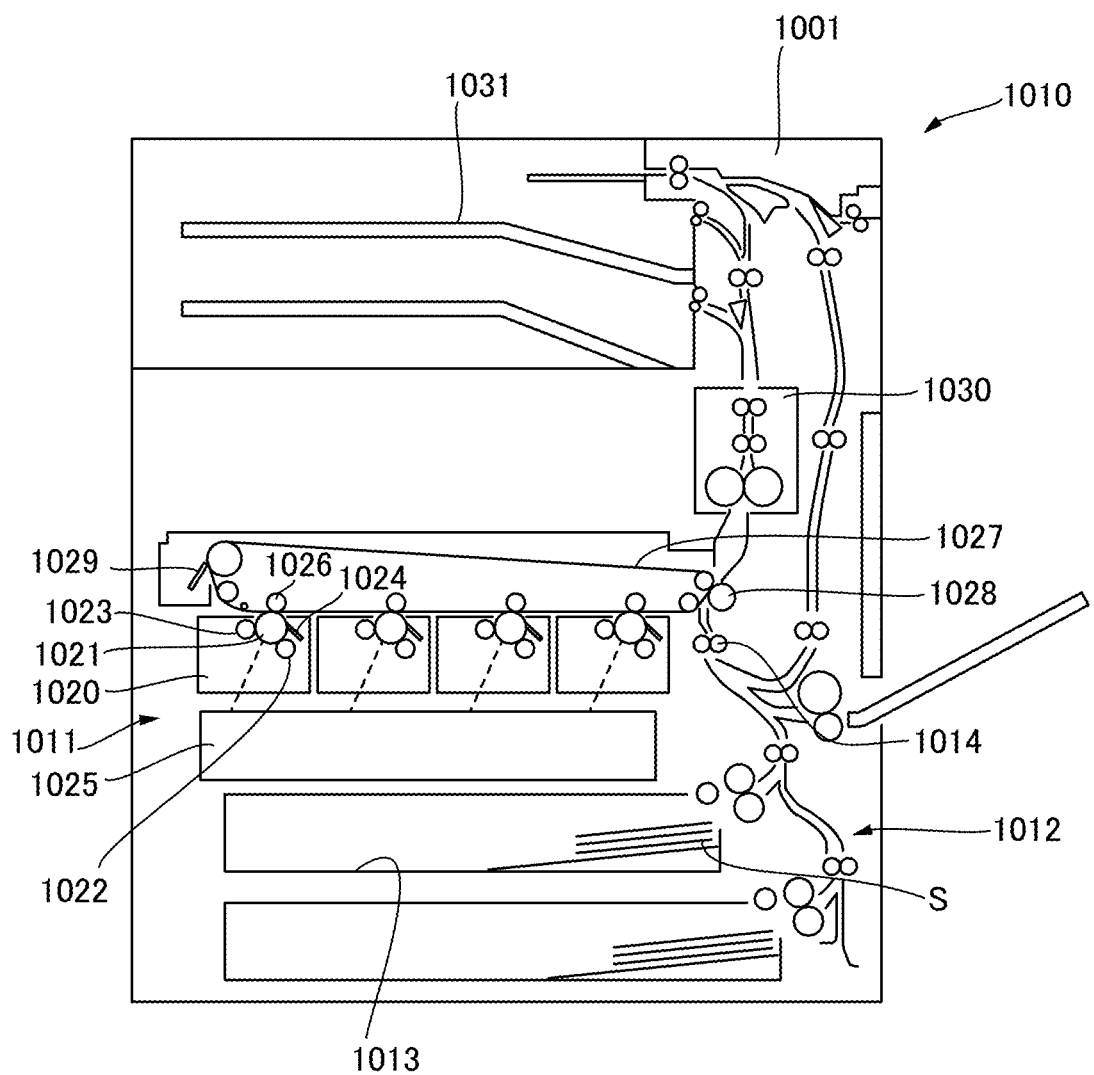
FIG. 18 is an explanatory diagram illustrating a configuration of an image forming apparatus including a cartridge according to the exemplary embodiment.
Figure 19:
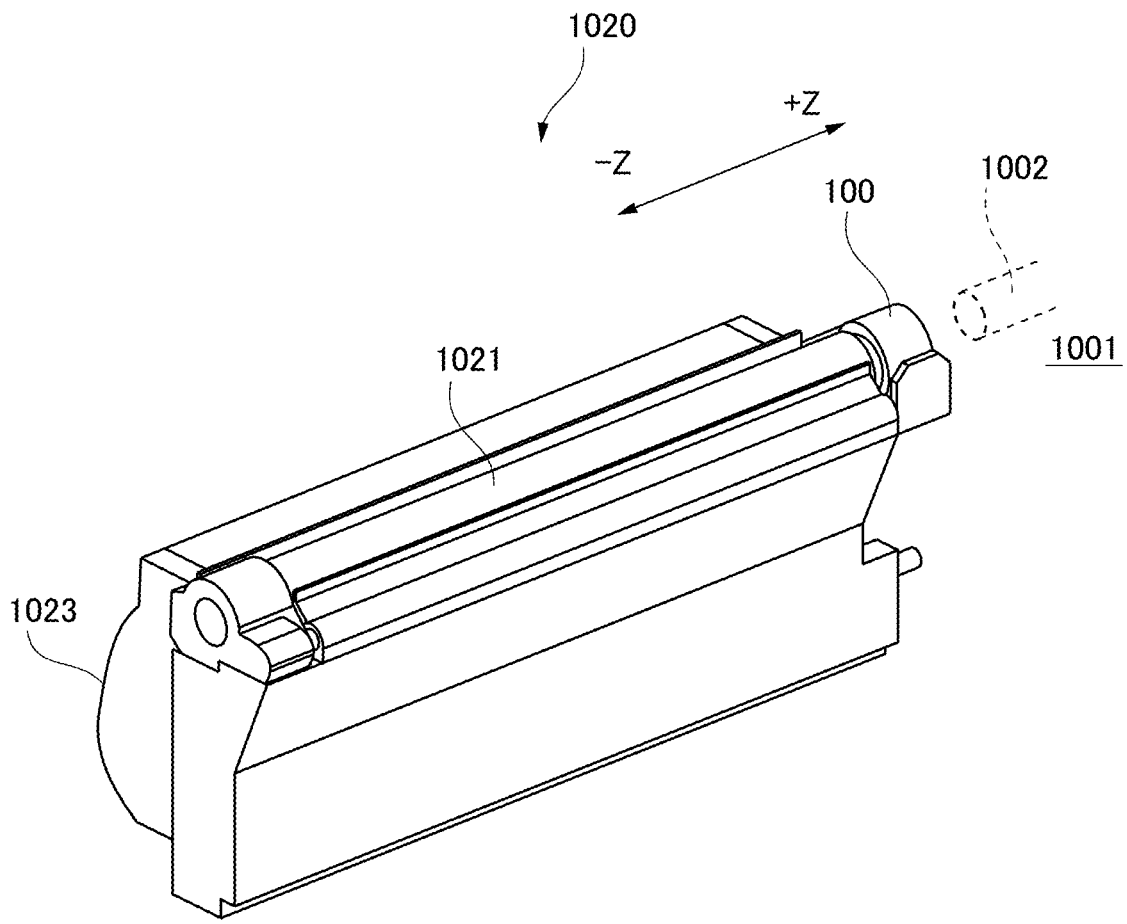
FIG. 19 is a perspective view of the cartridge according to the exemplary embodiment illustrating a configuration thereof.

In addition, FIG. 19 illustrates a configuration of a cartridge 1020 for image formation including the composite gear of the present exemplary embodiment, and FIG. 18 illustrates a configuration of an image forming apparatus 1010 to and from which the cartridge 1020 of FIG. 19 can be attached and detached. The composite gear of the present exemplary embodiment is used for, for example, a transmission member 100 of the cartridge 1020 illustrated in FIG. 19. The composite gear of the present exemplary embodiment is disposed so as to transmit a driving force from an image forming apparatus body 1001 to a mechanism in the cartridge 1020 through a drive shaft 1002. In the description below, first, configurations and operations of the image forming apparatus 1010 and the cartridge 1020 will be described with reference to FIGS. 18 and 19.

As illustrated in FIG. 18, the image forming apparatus 1010 is a full-color printer employing an electrophotographic system. The image forming apparatus 1010 includes an image forming portion 1011 and a conveyance portion 1012 that conveys a sheet S. The image forming portion 1011 serving as an image forming mechanism has a so-called tandem-type configuration in which a plurality of cartridges 1020 are arranged in a traveling direction of an intermediate transfer belt 1027. In the present exemplary embodiment, the image forming portion 1011 includes four cartridges 1020. The cartridges 1020 are process cartridges for image formation that respectively form yellow, magenta, cyan, and black toner images.

The plurality of cartridges 1020 are detachably attached to the image forming apparatus body 1001. Here, since the configurations of the cartridges 1020 are the same, only description of the leftmost cartridge 1020 in FIG. 18 will be given, and reference signs and descriptions of the other cartridges will be omitted.

The cartridge 1020 includes a photosensitive drum 1021, a charging roller 1022, a developing unit 1023, and a drum cleaner 1024. The photosensitive drum 1021 is rotationally driven at a predetermined process speed by an unillustrated drum motor disposed in the image forming apparatus body 1001. The surface of the photosensitive drum 1021 is uniformly charged by the charging roller 1022. The charged surface of the photosensitive drum 1021 is irradiated with a laser beam by a scanner unit 1025 on the basis of image information, and thus an electrostatic latent image is formed thereon. The electrostatic latent image on the photosensitive drum 1021 is developed into a toner image by attaching toner thereto by the developing unit 1023. The toner image on the photosensitive drum 1021 is transferred onto the intermediate transfer belt 1027 through primary transfer by applying a primary transfer bias between the photosensitive drum 1021 and a primary transfer roller 1026. Transfer residual toner remaining on the photosensitive drum 1021 after the transfer is removed by the drum cleaner 1024.

As a result of such a process being executed in each of the cartridges 1020, the toner images of respective colors formed on the photosensitive drums 1021 of the respective cartridges 1020 are transferred onto the intermediate transfer belt 1027 so as to be superimposed on one another, and thus a full-color toner image is formed on the intermediate transfer belt 1027. The toner image on the intermediate transfer belt 1027 is transferred through secondary transfer onto the sheet S conveyed by a conveyance portion 1012 to a secondary transfer portion constituted by the intermediate transfer belt 1027 and a secondary transfer roller 1028. Toner remaining on the intermediate transfer belt 1027 after the transfer is removed by a belt cleaner 1029.

The conveyance portion 1012 is constituted by a plurality of conveyance rollers, picks up a sheet S accommodated in a cassette 1013, and conveys the picked-up sheet S to the secondary transfer portion of the image forming portion 1011. The conveyance of the sheet S to the secondary transfer portion is performed at a timing matching conveyance of the toner image on the intermediate transfer belt 1027 by a registration roller pair 1014. The sheet S onto which the toner image has been transferred in the secondary transfer portion is heated and pressurized in a fixing unit 1030, and thus the toner image is fixed. The sheet S onto which the toner image has been fixed is discharged onto a discharge tray 1031.

FIG. 19 is a perspective view of the cartridge 1020 attached to the image forming apparatus body 1001 according to the present exemplary embodiment. The photosensitive drum 1021 includes, for example, an aluminum cylindrical member extending in a longitudinal direction, that is, ±Z direction, and a photosensitive layer formed on the surface of the cylindrical member. The transmission member 100 to which a rotational force of an unillustrated drum motor in the image forming apparatus body 1001 is attached to an end portion of the photosensitive drum 1021 in the longitudinal direction. The transmission member 100 is configured to be engaged with or disengaged from the drive shaft 1002 of the image forming apparatus body 1001 by a user attaching or detaching the cartridge 1020 to or from the image forming apparatus body 1001. For example, in the case of attaching the cartridge 1020 to the image forming apparatus body 1001, the user engages the transmission member 100 with the drive shaft 1002 by moving the cartridge 1020 in the +Z direction in FIG. 19 while coaxially aligning the transmission member 100 with the drive shaft 1002 of the image forming apparatus body 1001. In addition, in the case of detaching the cartridge 1020 from the image forming apparatus body 1001, the user disengages the transmission member 100 from the drive shaft 1002 by moving the cartridge 1020 in the −Z direction in FIG. 19.

Referring back to FIGS. 1A to 3C, the composite gear 10 of the present exemplary embodiment includes a first member 50 formed from a highly-rigid resin. The first member 50 constitutes a rotation shaft portion of the composite gear 10, and includes the rotation supporting portion 51 having a cylindrical shape. In addition, the composite gear 10 includes a second member 30 formed from a synthetic resin softer than the first member 50. The second member 30 covers the outer periphery of the first member 50, and at least includes a teeth portion 31 serving as at least one engaging tooth on the outermost peripheral surface thereof. In the present description, a portion where the first member 50 and the second member 30 are in contact with each other will be referred to as a connecting portion. In addition, regarding the composite gear 10, "rotation axis direction" refers to the direction of the rotation axis of the rotation supporting portion 51 unless otherwise described. "Peripheral direction" refers to a rotation direction about the rotation axis of the rotation supporting portion 51, and "radial direction" and "inward-radial direction" refer to directions with respect to the rotation axis of the rotation supporting portion 51.

As illustrated in FIGS. 1A to 3C, the rotation supporting portion 51 of the first member 50 constitutes a rotation shaft portion, and includes an inner hole 52 and outer wall portions 53 and 54 illustrated in FIG. 2B. An inner web 55 having a disk shape and coupled to the second member 30 is provided on the outer periphery of the rotation supporting portion 51.

As illustrated in FIGS. 2A and 2C, the inner web 55 of the present exemplary embodiment is provided with through holes 57. The through holes 57 are provided on a circle centering on the rotation axis of the rotation supporting portion 51. That is, the through holes 57 are positioned in approximately the same distance from the rotation axis of the rotation supporting portion 51. In the present exemplary embodiment, for example, the through holes 57 have so-called sector shapes as illustrated in FIGS. 3B and 3C.

In the present exemplary embodiment, two side edge portions 58 defining a through hole 57 oppose each other in the peripheral direction, and are each substantially parallel to a radial direction b1 with respect to the rotation center of the gear. The second member 30 includes an outer web 32 that nips the inner web 55 through the through holes 57 of the first member 50. Specifically, the outer web 32 includes a first flange 32a, penetrating portions 32b, and a second flange 32c. The first flange 32a is a portion extending from a ring-shaped rim 31r, on the outer peripheral side of which the teeth portion 31 are formed, toward the rotation axis of the rotation supporting portion 51 in the inward-radial direction. The penetrating portions 32b extend in the rotation axis direction from the inner edge of the first flange 32a to penetrate through the through holes 57, and are thus coupled to the second flange 32c. The second flange 32c extends from the penetrating portions 32b further toward the outer peripheral side than outer edge portions 57b of the through holes 57. As described above, the outer web 32 of the second member 30 are formed to nip, between the first flange 32a and the second flange 32c in the rotation axis direction, the outer edge portion 57b of the inner web 55. In other words, the first flange 32a and the second flange 32c provided in the second member 30 function as a nipping portion that nips a part of the first member 50 from both sides thereof in the axial direction.

The second member 30 is formed in a state of being integrated with the first member 50 by, for example, performing two-color molding on the first member 50 that has been already molded. At this time, the second member 30 is formed so as to penetrate through the through holes 57 of the inner web 55 of the first member 50 while leaving spaces on the inner peripheral side of the through holes 57 and so as to nip the inner web 55 from both sides. In addition, when the second member 30 is molded, the two-color molding is performed such that a space is provided on the outside of the outermost peripheral surface 55a of the inner web 55 of the first member 50 such that an inner peripheral surface 31ra of the rim 31r of the second member 30 does not come into contact with the outermost peripheral surface 55a.

That is, in the present exemplary embodiment, as illustrated in FIG. 3C, at the two portions described above, part of the first member 50 on the radially outer side and part of the second member 30 on the radially inner side are not in contact with each other, and thus spaces a1 and a2 are defined. Spaces a1 are spaces between inner edge portions 57a of the through holes 57 of the first member 50 and the penetrating portions 31b of the second member 30 that oppose each other in the radial direction with a predetermined distance therebetween. The space a2 is a space between the outermost peripheral surface 55a of the first member 50 and the inner peripheral surface 31ra of the rim 31r of the second member 30 that oppose each other in the radial direction with a predetermined distance therebetween. The first member 50 is manufactured by using a synthetic resin material serving as a first resin material having a relatively high rigidity such as polyacetal, polybutylene terephthalate, polyphenylene sulfide, polyamide, or nylon. The second member 30 is manufactured by using a second resin material different from the first resin material, for example, a resin material having a relatively high slidability such as polyacetal copolymer resin.

Figure 4A:
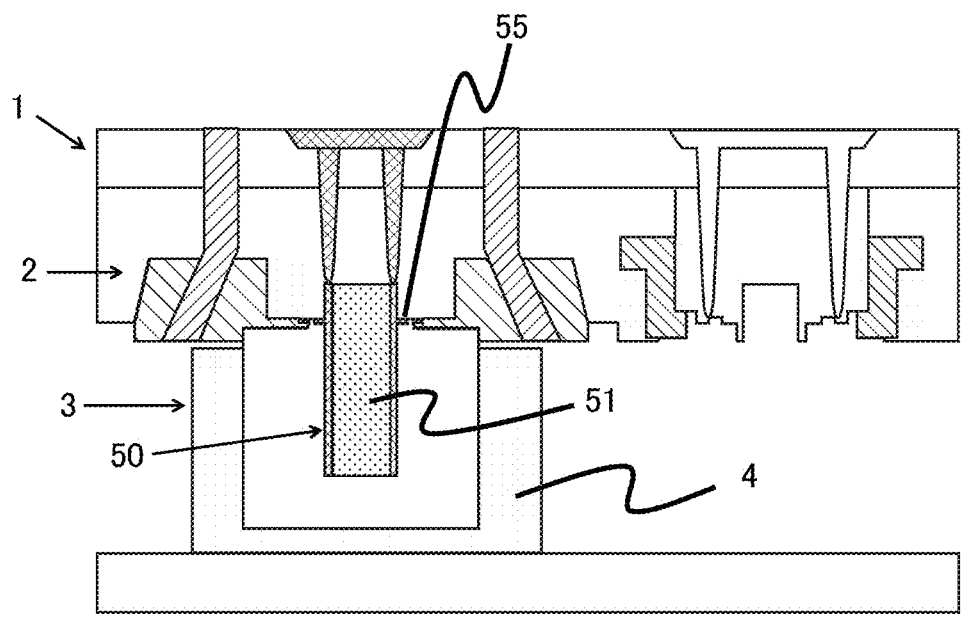
FIGS. 4A and 4B are each an explanatory diagram illustrating a configuration and operation of a mold for forming the composite gear according to the exemplary embodiment.
Figure 4B:
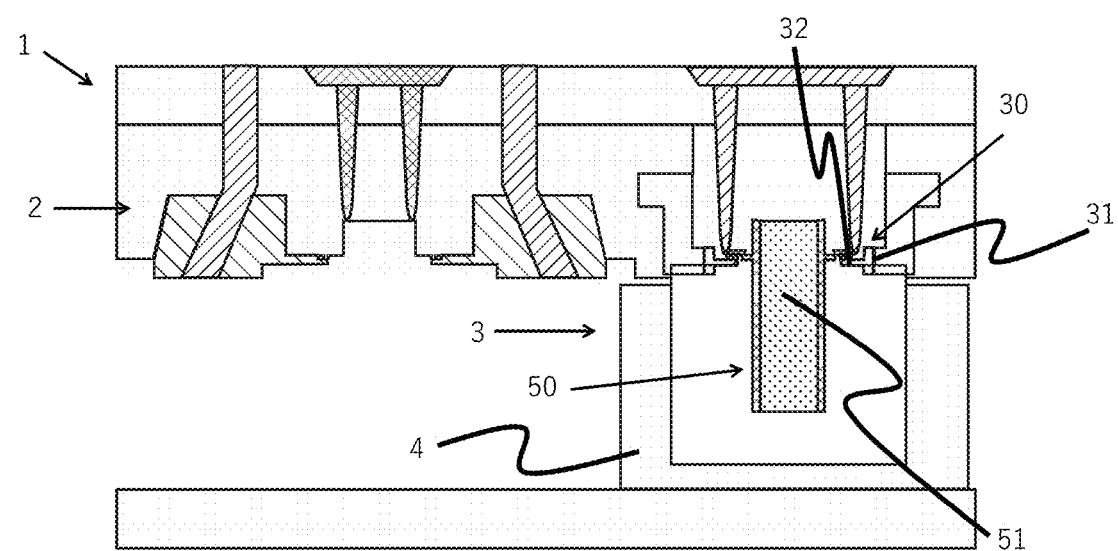

FIGS. 4A and 4B illustrate an example of a mold for forming the composite gear 10 in the present exemplary embodiment. A mold 1 is used to form the first member 50 and the second member 30 by injection molding by a method such as die slide injection: DSI, and thus forms the composite gear 10. In this example, the mold 1 includes a fixed mold 2 on the gate side and a movable mold 3 including a movable piece 4 on the opposite side to the gate. The movable piece 4 is capable of moving to a position to form the second member 30 together with the first member 50 within the mold after the first member 50 is formed.

The movable piece 4 as a movable mold constitutes a first molding portion that forms the first member 50 together with a left half portion of the fixed mold 2 serving as a first fixed mold, and constitutes a second molding portion that forms the second member 30 together with a right half portion of the fixed mold 2 serving as a second fixed mold.

FIG. 4A illustrates a state in which the movable piece 4 is at a position to form the first member 50 in the mold 1 and the first member 50 is being formed. FIG. 4B illustrates a state in which the movable piece 4 has moved to a position to form the second member 30, and the second member 30 is being formed at this position.

That is, this mold has a configuration in which a first molding portion for molding a first member and a second molding portion for molding a second member are disposed in a single mold. Further, the first molding portion disposed on the movable side of the mold moves to a position opposing the second molding portion together with the first member after molding the first member, and molds the second member such that the first member and the second member are integrated.

Comparing the present exemplary embodiment illustrated in FIGS. 1A to 3C with the conventional example illustrated in FIGS. 14A to 15C, the configuration of the inner web of the first member and the outer web of the second member is different. As described above, it is preferable that the first member and the second member of the composite gear are strongly coupled to each other, and the inner web and the outer web need to be coupled to each other by nipping.

In addition, to suppress phase deviation in the rotation direction caused by torque for driving the gear, an anchor shape needs to be formed on the first member to secure a coupling strength with the second member. Although there is a big difference between the present exemplary embodiment and the conventional example in the configuration of the webs, the point that the inner web is nipped by the outer web is the same. In addition, the recess/projection portions 67 serve as the anchor shape in the conventional example, and the through holes 57 serve as the anchor shape in the present exemplary embodiment.

However, the composite gear 10 of the present exemplary embodiment is greatly different from the conventional example in that the spaces a1 and a2 where the radially outer side of the first member 50 and the radially inner side of the second member 30 are not in contact with each other are defined at the through holes 57 and the outermost periphery of the first member 50. As described above, in the conventional configuration as illustrated in FIGS. 13A to 15C, a composite gear in which the first member covers the second member and the spaces described above are not provided has a risk of occurrence of distortion and breakage caused by difference in the shrinkage over time. In other words, measures such as setting a use period in which the possibility of breakage is low enough in consideration of the shrinkage over time or accepting the increase in the cost and setting the thicknesses of the first member 50 and the second member 30 to such values as not to cause breakage need to be taken.

In contrast, in the present exemplary embodiment illustrated in FIGS. 1A to 3C, the spaces a1 and a2 are defined between the first member 50 and the second member 30, therefore the first member 50 is less likely to hinder shrinkage of the second member 30, and occurrence of distortion is suppressed.

For example, FIGS. 5A to 6C illustrate a state where the second member 30 of the composite gear 10 of the present exemplary embodiment has shrunk. Since the second member 30 is a circular molded product, shrinkage in an inner-radial direction occurs toward the center of the circular shape. Therefore, the spaces a1 and a2 that have been present before the occurrence of the shrinkage are reduced into smaller spaces a3 and a4, and spaces a5 are newly defined. That is, according to the shrinkage of the second member 30, the distance between the inner edge portions 57a of the through holes 57 of the inner web 55 and the penetrating portions 32b of the outer web 32 in the radial direction and the distance between the outermost peripheral surface 55a of the first member 50 and the inner peripheral surface 31ra of the rim 31r of the second member 30 are reduced. Meanwhile, gaps serving as the spaces a5 are generated between the outer edge portions 57b of the through holes 57 of the inner web 55 and the penetrating portions 32b of the outer web 32 in the radial direction. As described above, the spaces a1 to a5 between the first member 50 and the second member 30 function as a shrinkage allowance that absorbs relative positional changes between the inner web 55 and the outer web 32 in the radial direction caused by the difference in shrinkage factor between the first member 50 and the second member 30. As an effect of this shrinkage allowance, occurrence of distortion of the composite gear can be suppressed.

In addition, the through holes 57 of the first member 50 of the composite gear 10 of the present exemplary embodiment each include the two side edge portions 58 each parallel to a radial direction b1. As described above, the second member 30 also shrinks in the peripheral direction at approximately the same rate as the shrinkage in the radial direction. Therefore, the second member 30 shrinks in a state of being in contact with the side edge portions 58 of the through holes 57 of the first member 50. As a result of this effect, no gap is generated in the peripheral direction between the first member 50 and the second member 30 of the gear even when the second member 30 shrinks, and therefore firm coupling between the two is maintained. Further, since the shrinkage of the second member 30 occurs along the side edge portions 58 of the through holes 57 approximately parallel to radial directions, occurrence of distortion in the peripheral direction of the gear is also suppressed.

As described above, even after relative positional change occurs between the inner web 55 and the outer web 32, a state where the inner web 55 is nipped by the outer web 32 in the radial direction and the outer web 32 is engaged with the inner web 55 through the through holes 57 is maintained. That is, the spaces a1 to a5 described above enable suppressing occurrence of distortion by allowing the dimensional changes of the first member 50 and the second member 30 caused by the difference in the shrinkage factor without affecting the coupling between the first member 50 and the second member 30 in the axial direction and the peripheral direction that makes the two relatively unmovable. In other words, the composite gear of the present exemplary embodiment is capable of suppressing breakage such as cracks caused by shrinkage over time while strongly coupling the first member 50 and the second member 30 to each other. In the description below, configurations in which details of the composite gear of the present exemplary embodiment are modified will be described with reference to FIGS. 7A to 12B.

FIGS. 7A to 12B illustrate configurations in which details of the composite gear of the present exemplary embodiment are modified. In the description below, same elements as the composite gear 10 and the mold 1 illustrated in FIGS. 1A to 4B will be denoted by the same reference signs, and redundant description will be omitted.

Figure 7A:
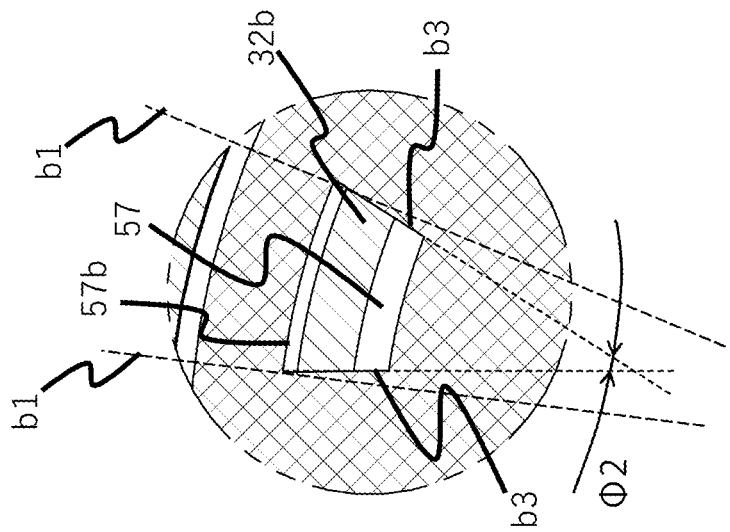
FIGS. 7A to 7C are each an explanatory diagram illustrating a configuration of a composite gear according to Example 2.
Figure 7B:
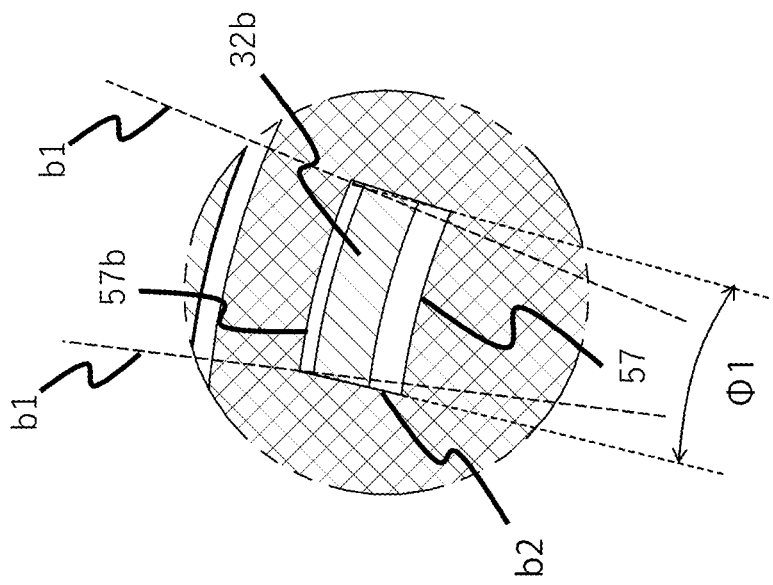
Figure 7C:
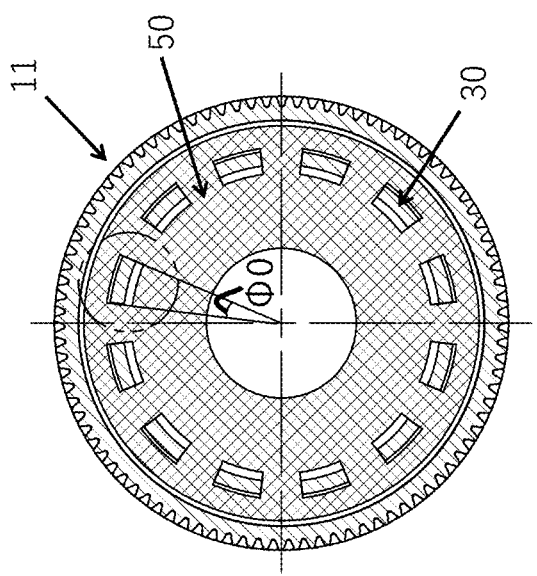

In the configuration illustrated in FIG. 3C, the side edge portions 58 of the through holes 57 are each parallel to the radial direction b1 from the rotation axis. In contrast, in a composite gear 11 illustrated in FIGS. 7A to 7C, side edge portions b2 and b3 of the through holes 57 are inclined with respect to the radial directions b1. FIG. 7A is a section view of the composite gear 11 taken at the same position as the composite gear 10 of FIG. 3B. FIG. 7B illustrates an example in which the side edge portions b2 are formed at angles smaller than the radial directions b1, and FIG. 7C illustrates an example in which the side edge portions b3 are formed at angles larger than the radial directions b1. To be noted, whether the inclination angle of the side edge portions is large or small is indicated by whether angles $\varphi 1$ and $\varphi 2$ formed by extension lines of ridgelines of the two side edge portions is large or small with respect to a central angle $\varphi 0$ of the through hole 57 serving as a standard, that is, 0° illustrated in FIG. 7A. In the case where the inclination angle of the side edge portions is a negative value, as illustrated in FIG. 7B, the rate of reduction of the interval between the side edge portions b2 in the inward-radial direction is smaller than in the case where the side edge portions are parallel to the radial directions b1, that is, the side edge portions b2 are closer to being parallel to each other. In addition, in the case where the inclination angle of the side edge portions is a positive value, as illustrated in FIG. 7C, the rate of reduction of the interval between the side edge portions b3 in the inward-radial direction is smaller than in the case where the side edge portions are parallel to the radial directions b1. In other words, in the case where the inclination angle of the side edge portions is a positive value, the intersection point of the extension lines of the side edge portions is closer to the through hole 57 than to the rotation axis of the composite gear 10.

According to the composite gear 11 having such a configuration, distortion can be suppressed and the coupling force can be maintained even in the case where the shrinkage of the second member 30 has anisotropy. For example, in the case where the shrinkage factor of the second member 30 is higher in the radial direction than in the peripheral direction, in the configuration described in FIGS. 3A to 3C, there is a possibility that the side edge portions 58 of the through holes 57 of the first member 50 resist the shrinkage of the second member 30 and tensile stress is generated. In the case of such anisotropy of shrinkage of the second member 30, setting the intersection angle φ1 of the two side edge portions b2 of the through hole 57 to a small value as illustrated in FIG. 7B suppresses hindrance of the shrinkage of the second member 30, and thus suppresses occurrence of distortion of the composite gear 11.

In addition, in the case where the shrinkage factor of the second member 30 is higher in the radial direction than in the peripheral direction, a gap is generated between the first member 50 and the second member 30. In this case, there is a possibility that the first member 50 and the second member 30 rattle. In the case of such anisotropy of shrinkage of the second member 30, setting the intersection angle φ2 of the two side edge portions b3 of the through hole 507 to a large value as illustrated in FIG. 7C suppresses occurrence of the gap after the shrinkage of the second member 30, and thus the firm coupling between the first member 50 and the second member 30 can be maintained.

As can be seen from the examples described above, the intersection angle of the two side edge portions of the through hole of the first member 50 can be determined in accordance with the shrinkage factor of the second member 30, for example, with the anisotropy of the shrinkage factor. In this case, the angles of the linear side edge portions can be selected such that, for example, the angles are within the range of −10° to +10° with respect to the radial direction of the rotation shaft portion.

Figures 8A, 8B, 8C:
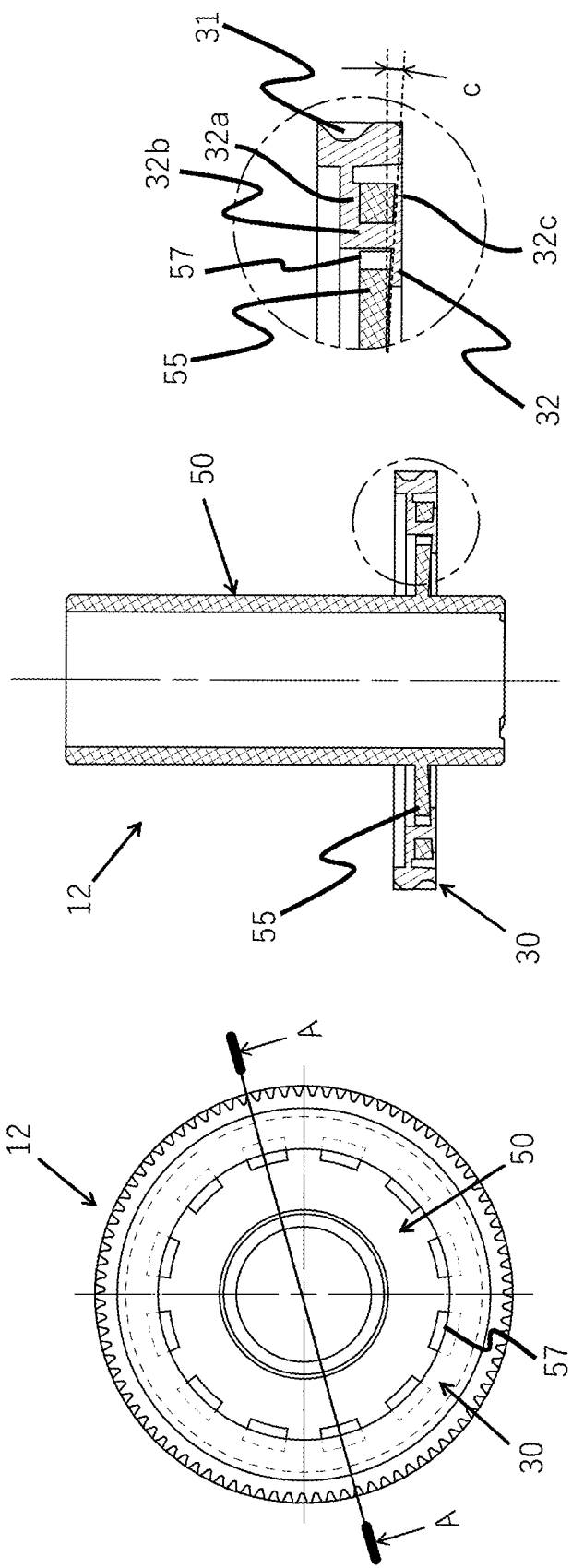
FIGS. 8A to 8C are each an explanatory diagram illustrating a configuration of a composite gear according to Example 3.

FIGS. 8A to 8C illustrate a different configuration of a composite gear 12. Here, FIG. 8A is a front view of the composite gear 12, FIG. 8B is a section view of the composite gear 12, and FIG. 8C is a detailed view of the composite gear 12. This example is a configuration in which shrinkage of the second member 30 in the thickness direction is taken into consideration. That is, shrinkage of the second member 30 formed from polyacetal resin or the like also slightly occurs in the thickness direction in addition to the inward-radial direction and the peripheral direction. Since the shrinkage in the thickness direction is very small as compared with the outer diameter or the circumference, the distortion caused thereby is small, and therefore the possibility of occurrence of a crack of the molded product is low. However, in the configuration of the present exemplary embodiment, since the first member 50 is nipped by the second member 30, even slight shrinkage in the thickness direction can hinder shrinkage of the second member 30 in the inward-radial direction. Therefore, as illustrated in FIGS. 8B and 8C, the inner web 55 of the first member 50 of the composite gear 12 is provided with gradient c such that the thickness thereof gradually decreases toward the inside. According to such a configuration in which the inner web 55 of the first member 50 is provided with the gradient c of thickness, the shrinkage in the inward-radial direction becomes less likely to be hindered even in the case where the second member 30 shrinks in the thickness direction, and the effect described above becomes more likely to be obtained. In other words, according to the shrinkage of the penetrating portions 32b of the outer web 32 and the like, the first flange 32a and the second flange 32c nipping the inner web 55 come closer to each other in the axial direction. At this time, due to the gradient c of the inner web 55, the outer web 32 receives a reaction force in the inward-radial direction from the inner web 55, and thus it becomes easier for the second member 30 to uniformly shrink in the inward-radial direction. To be noted, the gradient c is set in at least the part of the inner web 55 nipped by the second member 30.

FIGS. 9A to 9C illustrate a different configuration of a composite gear 13. Here, FIG. 9A is a front view of the composite gear 13, FIG. 9B is a back view of the composite gear 13, and FIG. 9C is a section view of the composite gear 13. The composite gear 13 includes gate traces 33 for injection molding of the second member 30 at positions overlapping with the through holes 57 of the first member 50 as viewed in the axial direction, which are indicated by four black dots in FIG. 9B. In the case where a plurality of gates are used, it suffices as long as at least part of the gate traces 33 overlaps with the through holes 57, but it is preferable that all of the gate traces 33 overlap with the through holes 57. In addition, focusing on each gate, it suffices as long as at least a partial area of the gate trace 33 overlaps with the through hole 57, but it is preferable that the entirety of the gate trace 33 overlaps with the through hole 57 as viewed in the axial direction. By setting the positions of the gates for insert molding of the second member 30 to positions indicated by the gate traces 33, pressure generated at the time of injection molding of the second member 30 can be dissipated to the opposite side of the gates through the through holes 57. This makes the first member 50 be less likely to be deformed, and is thus beneficial.

Figure 10A:
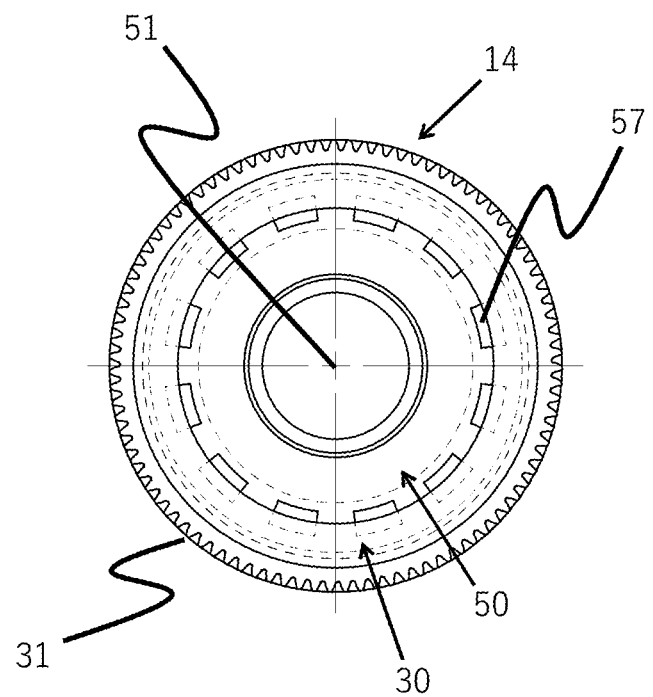
FIGS. 10A and 10B are each an explanatory diagram illustrating a configuration of a composite gear according to Example 5.
Figure 10B:
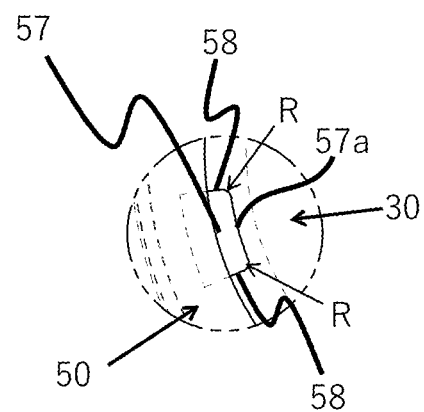

FIGS. 10A and 10B illustrate a different configuration of a composite gear 14. Here, FIG. 10A is a front view of the composite gear 14, and FIG. 10B is a detailed view of a part of the composite gear 14 in the vicinity of a through hole 57. In the composite gear 14, corner parts R of each through hole 57 of the first member 50 are have curved shapes such as chamfered surfaces or cylindrical surfaces. Each through hole 57 has a sector shape defined by two side edge portions 58 and an outer edge portion 57b and an inner edge portion 57a interconnecting these as described above. That is, the side edge portions 58, the outer edge portion 57b, and/or the inner edge portion 57a are interconnected via corner parts R that have curved shapes such as chamfered surfaces or cylindrical surfaces.

In particular, the corner parts R between the side edge portions 58 and the inner edge portion 57a may be chamfered or have cylindrical surfaces as illustrated in FIGS. 10A and 10B. According to such a configuration in which the corner parts R between the inner edge portion 57a and the side edge portions 58 are not chamfered or not provided with cylindrical surfaces and are configured as sharp-edged corners unlike the configuration described above, concentration of stress occurs in the corner parts due to driving torque of the gear as a result of a so-called notch effect. This stress acts to tear up the sharp-edged corners of the corner parts. However, by employing the configuration described above, the stress on the corner parts is dispersed, and thus the mechanical strength of the composite gear 14 can be enhanced.

Figures 11A, 11B, 11C:
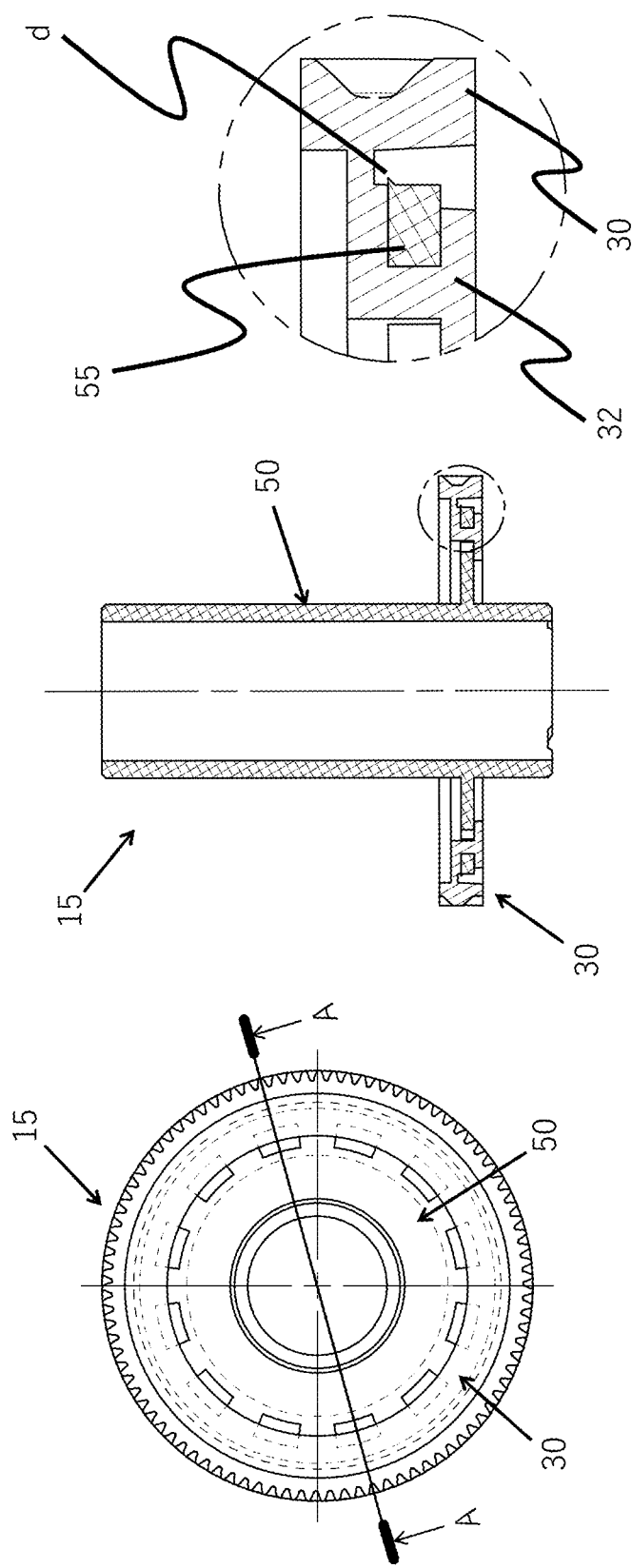
FIGS. 11A to 11C are each an explanatory diagram illustrating a configuration of a composite gear according to Example 6.
Figure 12A:
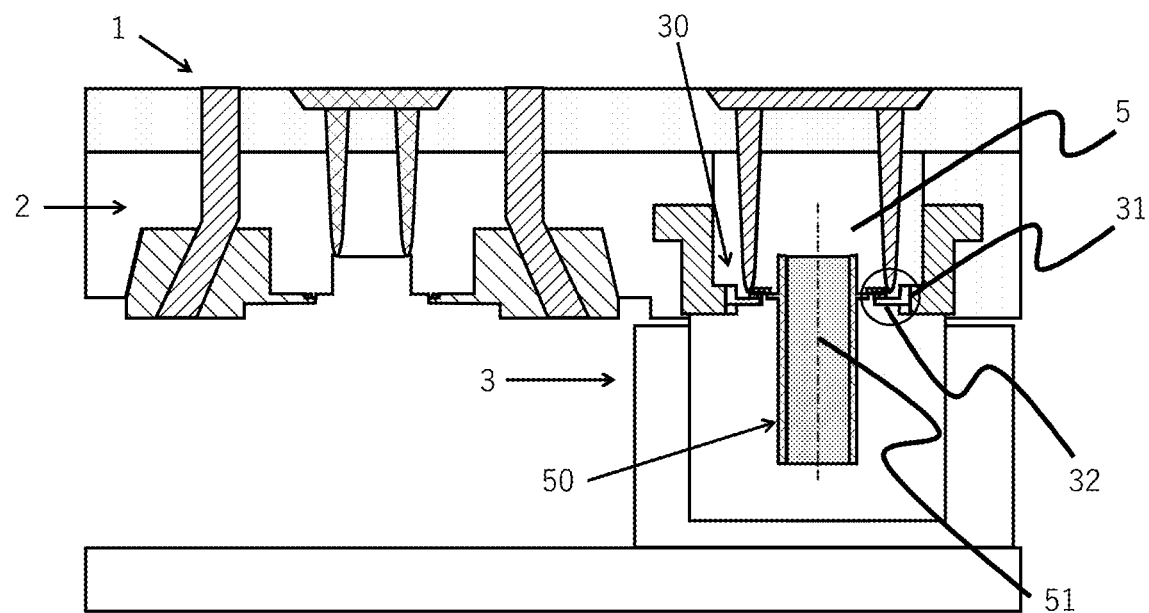
FIGS. 12A and 12B are each an explanatory diagram illustrating a configuration and operation of a mold for forming a composite gear according to Example 7.
Figure 12B:
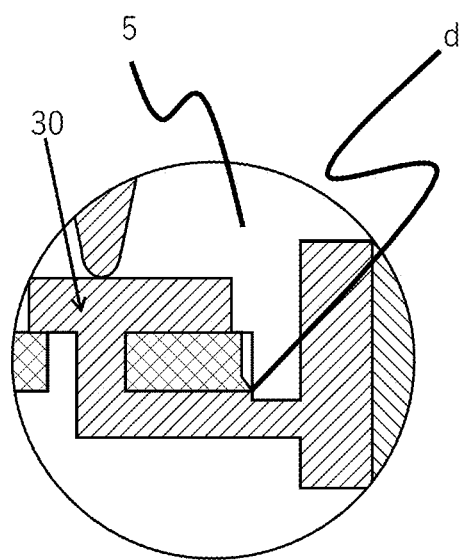

FIGS. 11A to 12B respectively illustrate a composite gear 15 having a yet different configuration and a mold 1 used for manufacturing the composite gear 15. Here, FIG. 11A is a front view of the composite gear 15, FIG. 11B is a section view of the composite gear 15, and FIG. 11C is a detailed view of the composite gear 15. FIG. 12A is a section view of the mold 1, and the configuration of the mold 1 is equivalent to that illustrated in FIG. 4. In addition, FIG. 12B illustrates a state when the second member 30 is molded. In the composite gear 15 of FIGS. 11A to 11C, a ring-like protruding ridge d is provided on the outermost peripheral portion of the inner web 55 of the first member 50 that has been already molded. According to such a configuration, when performing two-color molding of the second member 30 on the first member 50 that has been already molded, injection of the resin material for the second member 30 into a gap between the second member 30 and the first member 50 can be suppressed by bringing the protruding ridge d of the first member 50 into contact with a mold piece 5. That is, a space for absorbing the shrinkage of the second member 30 where the outermost periphery of the first member 50 and the inner periphery of the second member 30 are not in contact with each other can be reliably defined therebetween. Therefore, a composite gear having the configuration of the present exemplary embodiment can be manufactured more easily and more reliably.

Figures 20A, 20B:
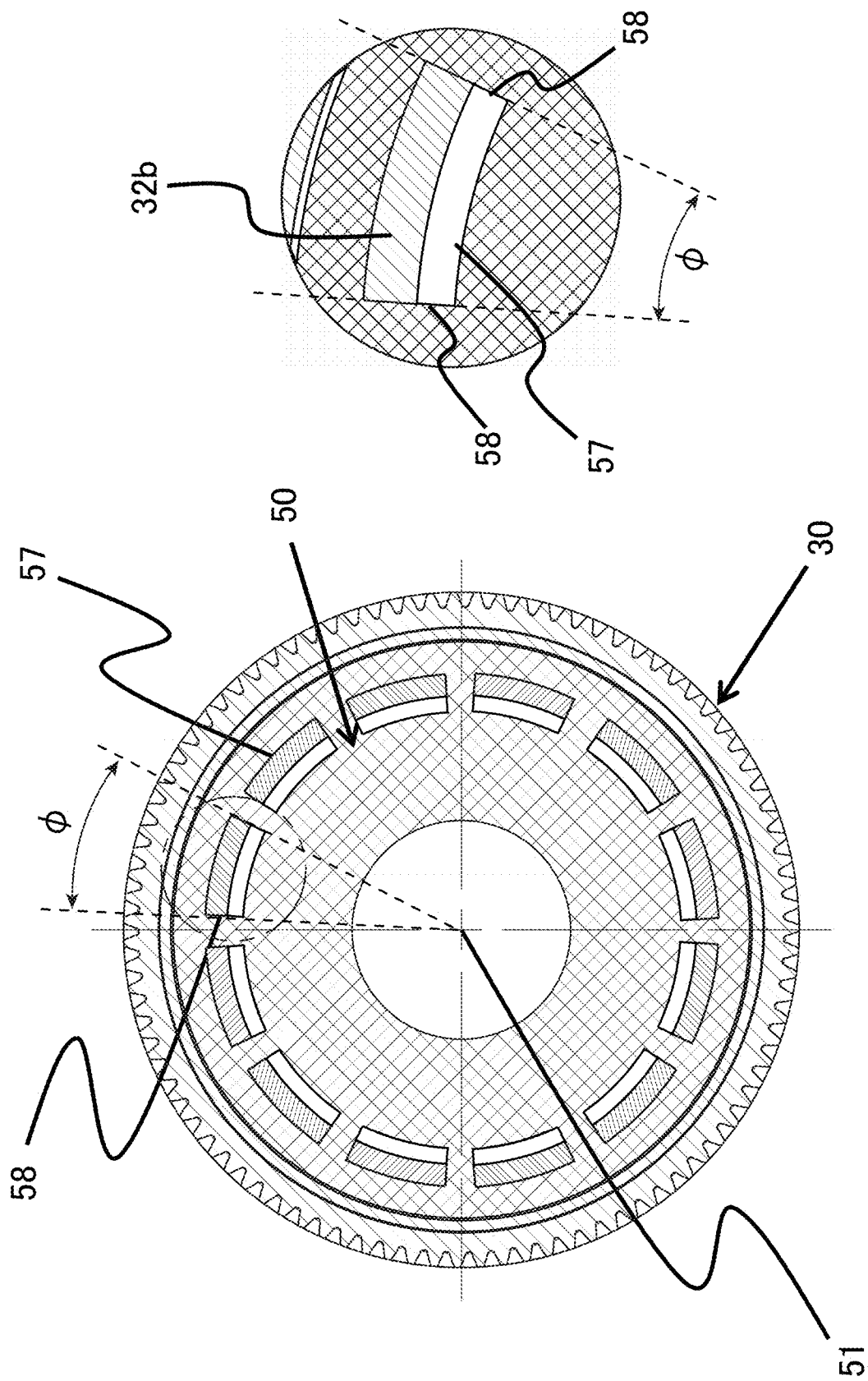
FIGS. 20A and 20B are each an explanatory diagram illustrating a modification example of the composite gear according to the exemplary embodiment.

In addition, FIGS. 20A and 20B illustrate a yet different configuration. This configuration is different from the configuration illustrated in FIGS. 3A to 3C in the central angle φ of each through hole 57 defined in the inner web 55 with respect to the rotation center of the first member 50. In other words, the ratio between regions where the through holes 57 are defined and regions where resin is injected as part of the inner web 55 in the peripheral direction is different between the configuration of FIGS. 20A and 20B and the configuration of FIGS. 3A to 3C. By controlling the central angle φ of each through hole 57 of the first member 50 as illustrated in these figures, pressure generated when molding the second member 30 can be adjusted, and also the rigidity of the inner web 55 of the first member 50 can be adjusted. As a result of this, an effect of suppressing deformation of the inner web 55 of the first member 50 accompanied by molding of the second member 30 can be achieved while maintaining the effect of suppressing the distortion caused by the shrinkage of the second member 30.

In consideration of the above, the central angle φ formed between the extension lines of the ridgelines of the two side edge portions of the through hole 57 is, for example, preferably within the range described below.

$$15 - \sqrt{225 - \frac{l^4}{8t^2}} \leq \Phi \leq 15 + \sqrt{225 - \frac{l^4}{8t^2}}$$

To be noted, l [mm] represents the distance from the outermost peripheral surface of the first member 50 to the outer edge portions 57b of the through holes 57, and t [mm] represents the thickness of the inner web 55 of the first member 50 in the vicinity of the through holes 57.

In each configuration example of the present exemplary embodiment described above, an example in which the through holes 57 are provided in the first member 50 as illustrated in FIGS. 1A to 3C has been described. However, the configuration is not limited to this. FIGS. 21A to 23E illustrate configurations in which details of the composite gear of the present exemplary embodiment are modified. In the description below, the same elements as in the composite gear 10 illustrated in FIGS. 1A to 3C will be denoted by the same reference signs, and redundant description will be omitted.

FIG. 21A is a front view of a modification example, FIG. 21B is a section view of the composite gear taken along a line E-E of FIG. 21A, and FIG. 21C is a detailed view thereof. As illustrated herein, the through holes 57 may be provided in the second member 30. In this case, the inner web 55 of the first member 50 is provided with a first flange 55c extending in the radial direction, penetrating portions 55d extending in the axial direction to penetrate through the through holes 57, and a second flange 55e extending in the radial direction on the opposite side of the first flange 55c of the outer web 32. As a result of this, the first member 50 and the second member 30 are coupled to each other in a state in which the outer web 32 are nipped by the first flange 55c and the second flange 55e from both sides in the axial direction. In other words, the first flange 55c and the second flange 55e provided in the first member 50 function as a nipping portion that nips a part of the second member 30 from both sides in the axial direction. That is, in the present modification example, a part of the first member 50 nips a part of the second member 30 from both sides in the radial direction.

In the present modification example, spaces a6 are provided between the outer edge portions 57b of the through holes 57 and the outer peripheral surfaces of the penetrating portions 55b in the radial direction. In addition, a space a7 is also provided between the outermost peripheral surface of the inner web 55 and the rim 31r of the second member 30 in the radial direction. These spaces a6 and a7 function as a shrinkage allowance that absorbs relative positional changes between the first member 50 and the second member 30 caused by the difference in shrinkage factor between the first member 50 and the second member 30 while maintaining the coupling strength therebetween similarly to the spaces a1 and a2 of the configuration illustrated in FIGS. 1A to 3C.

In the present modification example, in the two-color molding, the first member 50 can be formed after forming the second member 30. According to the configuration of the present modification example, in the case where the material of the second member 30 has a higher melting point than the material of the first member 50, the performance of the gear can be enhanced by providing the through holes 57 in the second member 30.

Figures 22A, 22B, 22C:
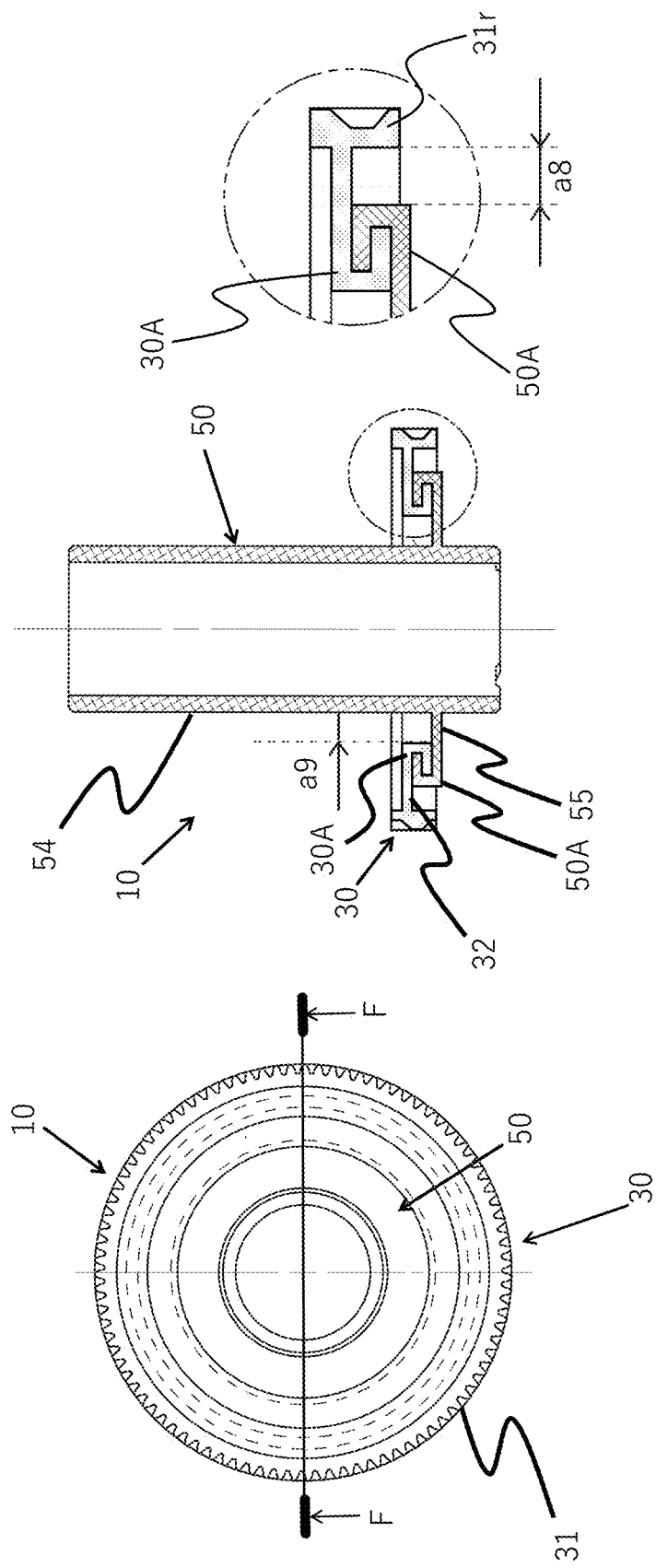
FIGS. 22A to 22C are each an explanatory diagram illustrating a modification example of the composite gear according to the exemplary embodiment.

In addition, FIG. 22A is a front view of another modification example, FIG. 22B is a section view of the composite gear illustrated in FIG. 22A taken along a line F-F, and FIG. 22C is a detailed view of FIG. 22B. As illustrated herein, an engaging shape 50A provided in the first member 50 and having a squared-C shape opening radially inward in section view may be combined with an engaging shape 30A provided in the second member 30 and having a squared-C shape opening radially outward in section view. That is, in the present modification example, a part of the first member 50, that is, the engaging shape 50A functions as a first nipping portion that nips a part of the second member 30 from both sides in the axial direction, and at the same time, a part of the second member 30, that is, the engaging shape 30A functions as a second nipping portion that nips a part of the first member 50 from both sides in the axial direction. In addition, the present modification example is an example of a configuration in which one of the first member and the second member nips the other without using through holes provided in the first member or the second member.

In the present modification example, a space a9 is provided between the inner peripheral surface of the engaging shape 30A, which is the innermost peripheral surface of the second member 30, and a surface of the first member 50 opposing the engaging shape 30A in the radial direction, that is, the outer wall portion 54 of the rotation supporting portion 51. In addition, a space a8 is provided between the outermost peripheral surface of the engaging shape 50A of the first member 50 and the rim 31r of the second member 30 opposing the engaging shape 50A in the radial direction. These spaces a8 and a9 function as a shrinkage allowance that absorbs relative positional changes between the first member 50 and the second member 30 caused by the difference in shrinkage factor between the first member 50 and the second member 30 while maintaining the coupling strength therebetween similarly to the spaces a1 and a2 of the configuration illustrated in FIGS. 1A to 3C. As a result of this, although the thickness of the molded product may increase, processing of the mold for manufacturing the molded product can be simplified.

Further, FIG. 23A is a perspective view of the first member 50 of a different modification example, and FIG. 23B is a perspective view of the composite gear 10 including the second member 30. FIG. 23C is a front view of the composite gear 10, and FIGS. 23D and 23F are section views of the composite gear 10 respectively taken along a line F-F and a line G-G. In addition, FIGS. 23E and 23G are respectively detailed views of FIGS. 23D and 23F.

The inner web 55 of the first member 50 of the present modification example includes a plurality of recess portions 55u and a plurality of projection portions 55p on the outer periphery thereof. Meanwhile, the second member 30 is formed such that the first flange 32a and the second flange 32c of the outer web 32 of the second member 30 nip the projection portions 55p of the inner web 55 from both sides in the axial direction.

In the present modification example, a space a10 is provided between the inner peripheral surface of the outer web 32, which is the innermost peripheral surface of the second member 30, and a surface of the first member 50 opposing the outer web 32 in the radial direction, that is, the outer wall portion 54 of the rotation supporting portion 51. In addition, a space a11 is provided between the outer peripheral surface of the projection portions 55p, which is the outermost peripheral surface of the first member 50, and the rim 31r of the second member 30 opposing the projection portions 55p in the radial direction. Further, spaces a12 are provided between the outer peripheral surfaces of the recess portions 55u and a surface of the second member 30 opposing the recess portions 55u, that is, a surface interconnecting the first flange 32a and the second flange 32c and extending in the axial direction. These spaces a10 to a12 function as a shrinkage allowance that absorbs relative positional changes between the first member 50 and the second member 30 caused by the difference in shrinkage factor between the first member 50 and the second member 30 while maintaining the coupling strength therebetween similarly to the spaces a1 and a2 of the configuration illustrated in FIGS. 1A to 3C.

The present modification example is another example of a configuration in which one of the first member and the second member nips the other without using through holes provided in the first member or the second member. As a result of this, processing of a mold for manufacturing the composite gear 10, which is a molded product, can be simplified. To be noted, although an example in which the first member 50 includes the recess portions 55u and the projection portions 55p has been illustrated in FIGS. 23A to 23G, the second member 30 may be formed to include recess portions and projection portions on the inner periphery thereof and the first member 50 may be formed to nip the projection portions. As a result of this, processing of the mold for manufacturing the molded product can be simplified.

In the description below, evaluation results on the performance or characteristics of composite gears having configurations illustrated in FIGS. 1A to 6C as Examples 1 to 7 and composite gears having configurations of modification examples illustrated in FIGS. 20A to 23G will be described.

Example 1

In the description below, evaluations for a gear of Example 1 and composite gears of Comparative Examples 1 and 2 on endurance time in the case where there is a big difference in shrinkage factor between the first member 50 and the second member 30 will be described. The configuration of Example 1 is the composite gear illustrated in FIGS. 1A to 3C. Polybutadiene terephthalate resin containing 30% of glass fiber was used for the first member 50, and polyacetal copolymer resin was used for the second member 30. The teeth portion 31 of the second member 30 was formed at a module m of 0.5, a pressure angle of 20°, a teeth number of 91, a helix angle β of 20°, and a tooth width t of 10 mm. The composite gear was formed by using a mold illustrated in FIG. 4 by molding the second member after the first member.

Table 1 below shows results of charging and storing the gears of Comparative Examples 1 and 2 and Example 1 in high-temperature furnaces of 80° C. and 120° C. and measuring time elapsed until a crack occurred. In addition, rotation transmission error measurement was performed. In this measurement, a transmission error of one tooth component during driving at a torque of 0.1 N·m and a rotation speed of 25 rpm was measured.

TABLE 1

| | | Comparative Example 1 | Comparative Example 2 | Example 1 |
|---|---|---|---|---|
| Material | | POM | PBT + POM | PBT + POM |
| Endurance time [hr] | 80[° C.] | 13230 | 1512 | 9530 |
| | 120[° C.] | 1825 | 105 | 1120 |
| Rotation transmission error [μm]* | | 4.6 | 2.5 | 1.6 |

*Transmission error of one tooth component during driving at a torque of 0.1 N · m and a rotation speed of 25 rpm Comparative Example 1 is an example of a conventional resin gear illustrated in FIGS. 13A and 13B, and was formed solely from polyacetal (polyoxymethylene: POM) resin. Comparative Example 2 is a composite gear having the configuration illustrated in FIGS. 14A to 15C, and the first member and the second member were formed from the same material composition as that of Example 1.

As shown in Table 1, comparing Example 1 with Comparative Examples 1 and 2, which were conventional configurations, large difference in rotation transmission error was recognized, and the error was particularly large in Comparative Example 1. This is considered to be because polyacetal having relatively low rigidity was used for both of the rotation supporting portion and the gear portion of the gear of Comparative Example 1, and thus the gear was deformed by the torque generated during the rotational driving. In contrast, since Comparative Example 2 and Example 1 were formed from composite materials, the rigidity of the components was high, and the result of the rotation transmission error was good.

However, in terms of the endurance time in a high-temperature environment, Comparative Example 1 was better, i.e., showed longer the endurance time, than Comparative Example 2 and Example 1. This is considered to be because Comparative Example 1 was formed from a single material and therefore distortion derived from the shrinkage difference did not occur. Still, in Comparative Example 1, a crack occurred after 13230 hours in the 80° C. environment and after 1825 hours in the 120° C. environment. This is not considered to be breakage caused by distortion, and is considered to be caused by decrease in the mechanical strength derived from extension or breakage/condensation of molecular chains of the material caused by aging under the high-temperature environment. In contrast, the endurance time of Comparative Example 2, which did not have a structure for absorbing the shrinkage of the second member 30 was remarkably short. This is considered to be because a distortion was caused by the shrinkage difference between the composite materials of the second member and the first member constituting the composite gear. In contrast, although Example 1 was also formed from composite materials, an endurance time shorter than but almost equivalent to that of Comparative Example 1 was obtained for Example 1. It is assumed that this indicates that since Example 1 included the spaces for absorbing the shrinkage of the second member 30 on the inner peripheral side of the through holes 57 and on the outer peripheral side of the first member 50, occurrence of the distortion was suppressed as much as possible.

Figure 16B:
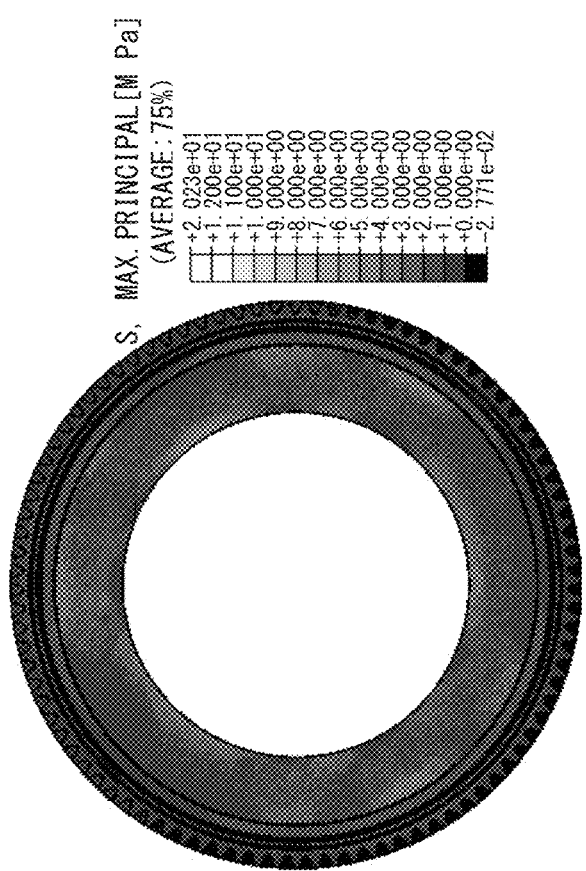
FIG. 16B is an explanatory diagram illustrating a distribution of stress generated at the time of shrinkage of the composite gear according to the exemplary embodiment.
Figure 16A:
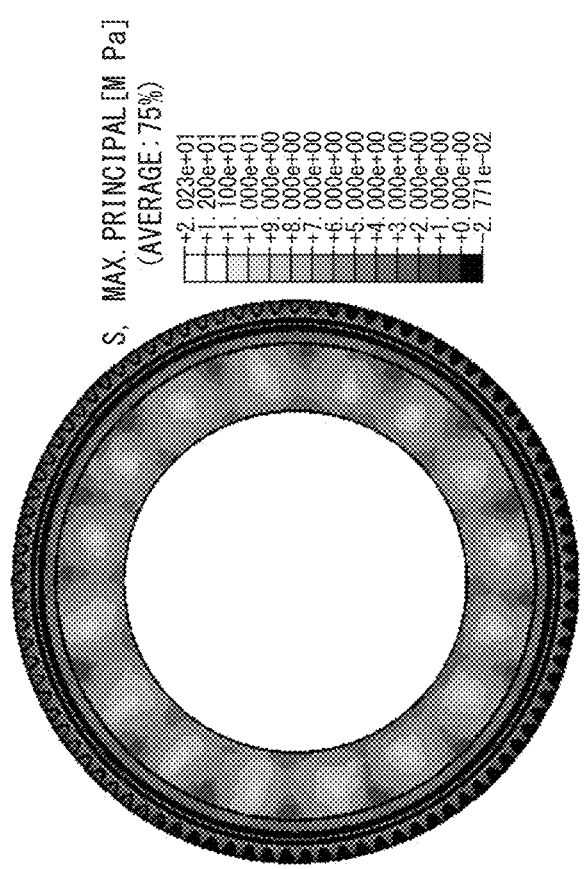
FIG. 16A is an explanatory diagram illustrating a distribution of stress generated at the time of shrinkage of a conventional composite gear.

FIGS. 16A and 16B show analysis results of stress generated in the second member in the case where it is assumed that shrinkage of 0.13% has occurred in the first member constituting the rotation shaft portion and shrinkage of 0.36% has occurred in the second member on the outer peripheral side, for the two composite gears of Comparative Example 2 and Example 1. FIG. 16A shows analysis results of Comparative Example 2, and FIG. 16B shows analysis results of Example 1. In these figures, a portion where the stress is high is expressed by a light color, and a portion where the stress is low is expressed by a deep color. As can be seen from comparing FIG. 16A with FIG. 16B, high stress is generated in Comparative Example 2 illustrated in FIG. 16A. Portions where the stress is highest correspond to recess/projection portions 67 of the first member 50 illustrated in FIG. 14A. That is, this indicates that the shapes of the recess/projection portions 67 provided as an anchor in the rotation direction generate stress as an effect of the shrinkage. In contrast, it can be seen that, according to Example 1, stress is not generated even in the case where shrinkage has occurred in the second member because the spaces for absorbing the shrinkage are provided.

Example 2

In the description below, evaluation results of the composite gear of Example 1, the composite gear of FIG. 7B corresponding to Example 2-1, the composite gear of FIG. 7C corresponding to Example 2-2, and a conventional composite gear corresponding to Comparative Example 2 described above will be described. Although the material of each component and specifications of the gears of Examples 2-1 and 2-2 were the same as those of Example 1 described above, these examples were different from Example 1 in that the side edge portions of the through holes were inclined with respect to the radial direction from the center of the gear as illustrated in FIGS. 7B and 7C. Example 2-1 had a structure in which the side edge portions of the through holes were each inclined by −10° with respect to the radial direction as illustrated in FIG. 7B and Example 2-2 had a structure in which the side edge portions of the through holes were inclined by +10° with respect to the radial direction as illustrated in FIG. 7C. To be noted, the side edge portions of the through holes of Example 1 were parallel to the radial directions from the center of the gear.

Table 2 shown below shows results of charging and storing the composite gears of Comparative Example 2 and Examples 1, 2-1, and 2-2 in high-temperature furnaces of 80° C. and 120° C. and evaluating time elapsed until a crack occurred. In addition, the rotation transmission error after storing the composite gears in a normal-temperature normal-humidity environment of 23° C. and 50% for one year was also measured. In this measurement, a transmission error of one tooth component during driving at a torque of 0.1 N·m and a rotation speed of 25 rpm was measured.

TABLE 2

|  |  | Comparative Example 2 | Example 1 | Example 2-1 | Example 2-2 |
| --- | --- | --- | --- | --- | --- |
| Material |  | PBT + POM | PBT + POM | PBT + POM | PBT + POM |
| Inclination angle of side edge portions of through holes |  | — | 0 [°] | −10[°] | +10[°] |
| Endurance time [hr] | 80[° C.] | 1512 | 9530 | 12960 | 9242 |
|  | 120[° C.] | 105 | 1120 | 1680 | 1224 |
| Rotation transmission error after one year [μm]* |  | 2.5 | 2.0 | 2.6 | 1.0 |

*Transmission error of one tooth component during driving at a torque of 0.1 N · m and a rotation speed of 25 rpm As shown in Table 2, comparing Comparative Example 2, which had a conventional configuration, with Examples 2-1 and 2-2, it can be seen that the endurance time was greatly improved in Examples 2-1 and 2-2. Particularly, Example 2-1 was excellent in the endurance time as compared with Example 1. However, the rotation transmission error after one year was slightly worse in Example 2-1 than in Example 1. Meanwhile, it was also confirmed that the endurance time improved also in Example 2-2, but the endurance time of Example 2-2 was slightly inferior to that of Example 1 at 80° C. However, the rotation error after one year of Example 2-2 was better than that of Example 1, and the precision was higher. From these results, it can be considered that the shrinkage of the second member has anisotropy in Example 1 in which the side edge portions of the through holes were parallel to the radial directions from the rotation axis. For example, in the case where the shrinkage factor in the inward-radial direction is lower than the shrinkage factor in the peripheral direction, a gap is generated between the first member and the second member in the peripheral direction. In such a state, although distortion becomes less likely to occur, the rotation transmission error becomes worse due to the gap. Further, it is considered that, in Example 2-1, since the inclination of the side edge portions was set to −10°, which was a negative value, a bigger gap was generated, and thus the rotation transmission error became worse while the endurance time was improved. In contrast, it is considered that, in Example 2-2, since the inclination of the side edge portions was set to +10°, which was a positive value, no gap was generated but some distortion occurred, and thus the rotation transmission error was improved while the endurance time was slightly worsened.

From the evaluation results described above, it can be seen that the inclination angle of the side edge portions of the through holes can be selected in accordance with the shrinkage factor of the second member or which of the rotation transmission error and the durability is prioritized. For example, which of the rotation transmission error and the durability should be prioritized differs depending on the use of the composite gear, and therefore it is preferable that the selection can be appropriately made. For example, in the case where the shrinkage factor in the inward-radial direction is lower than the shrinkage factor in the peripheral direction, it can be considered to set the inclination of the side edge portions to a negative value to obtain rotation transmission precision, and set the inclination of the side edge portions to a positive value to obtain durability. In addition, in the case where the shrinkage factor in the inward-radial direction is higher than the shrinkage factor in the peripheral direction, it can be considered to set the inclination of the side edge portions to a positive value to obtain rotation transmission precision, and set the inclination of the side edge portions to a negative value to obtain durability.

Example 3

Figures 14A, 14B:
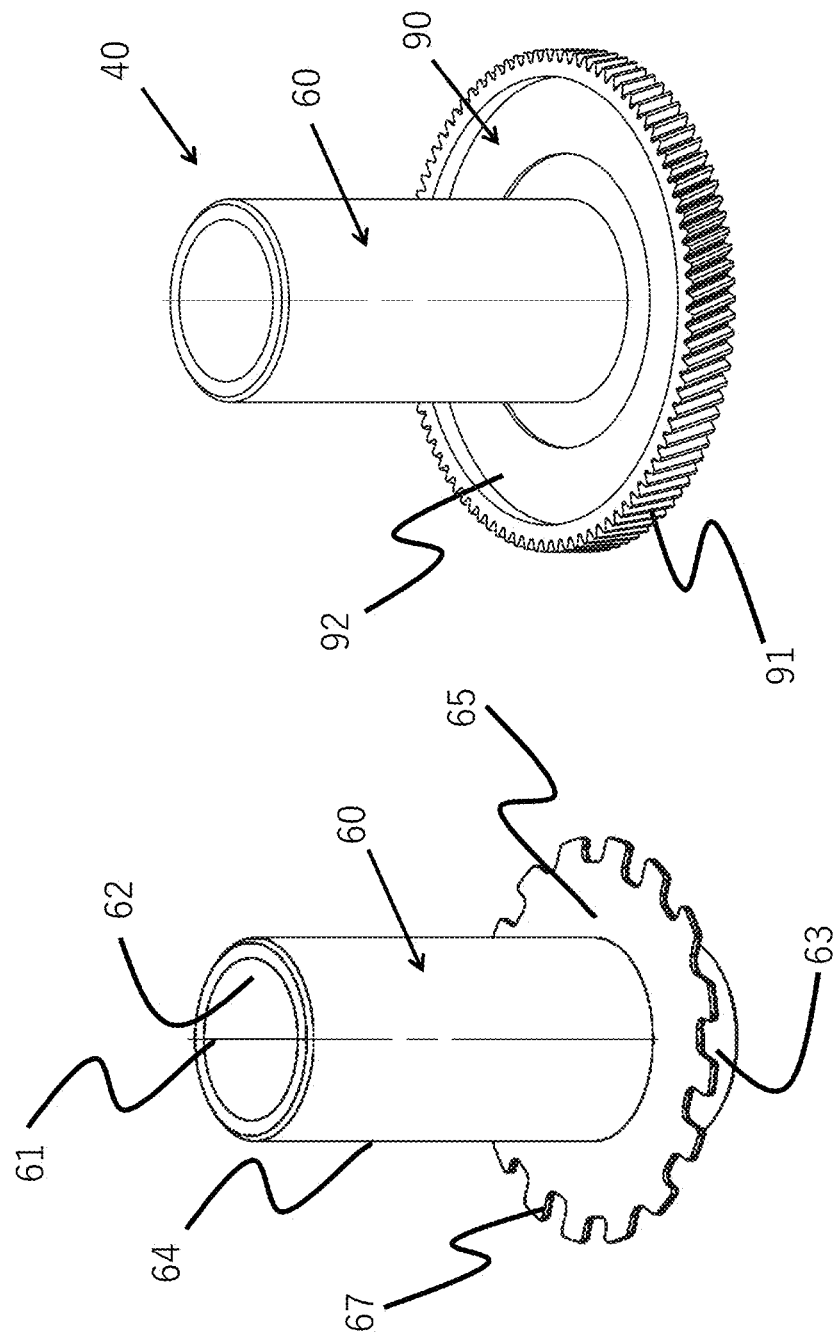
FIG. 14A is a perspective view of a first member constituting a rotation shaft portion of the conventional gear.
FIG. 14B is a perspective view of the entirety of the conventional gear including a second member including engaging teeth on the outer periphery thereof.

In the description below, evaluations of a composite gear of Example 3 illustrated in FIGS. 8A to 8C and a composite gear of Comparative Example 2 illustrated in FIGS. 14A and 14B will be described. Although the material of each component and specifications of the gear of Example 3 were the same as those of Example 1 described above, gradient of 0.5% was applied to the inner web of the first member of the composite gear of Example 3 such that the thickness of the inner web of the first member gradually decreased toward the inner side. Table 3 below shows results of results of charging and storing the composite gears of Comparative Example 2 and Examples 1 and 3 in high-temperature furnaces of 80° C. and 120° C. and measuring time elapsed until a crack occurred.

TABLE 3

|  |  | Comparative Example 2 | Example 1 | Example 3 |
|---|---|---|---|---|
| Material |  | PBT + POM | PBT + POM | PBT + POM |
| Gradient of web |  | 0 [°] | 0 [°] | 0.5[°] |
| Endurance time [hr] | 80[° C.] | 1512 | 9530 | 11260 |
|  | 120[° C.] | 105 | 1120 | 1570 |

As shown in Table 3, comparing Comparative Example 2 corresponding to a conventional configuration with Examples 1 and 3, it can be seen that the endurance time was greatly improved in Example 3. That is, even when the second member 30 had shrunk in the thickness direction, since the thickness of the inner web of the first member 50 gradually decreased to counteract the shrinkage, shrinkage in the inward-radial direction became less likely to be hindered, and thus an effect of suppressing occurrence of distortion was recognized.

Example 4

In the description below, evaluations of composite gears of Examples 1 and 4 having the configuration of FIGS. 9A to 9C and the conventional composite gear of Comparative Example 2 described above will be described. Table 4 below shows results of comparison of rotation transmission error between the composite gears of Examples 1 and 4 having the configuration of FIGS. 9A to 9C and the conventional composite gear of Comparative Example 2. The rotation transmission error is a transmission error of one tooth component during driving at a torque of 0.1 N·m and a rotation speed of 25 rpm. Although the material of each component, specifications of the gear, and the shape of web of Example 4 were the same as those of Example 1, in Example 4, gates for injecting the second member were provided at positions overlapping with the through holes of the first member as illustrated in FIG. 9B.

TABLE 4

|  | Comparative Example 2 | Example 1 | Example 4 |
|---|---|---|---|
| Material | PBT + POM | PBT + POM | PBT + POM |
| Positions of gates | Overlap with web | Overlap with web | Overlap with through holes |
| Rotation transmission error [μm]* | 2.5 | 1.6 | 0.8 |

*Transmission error of one tooth component during driving at a torque of 0.1 N · m and a rotation speed of 25 rpm Comparing Comparative Example 2 corresponding to the conventional configuration with Examples 1 and 4, the rotation transmission error was greatly improved in Example 4. This is considered to be because the injection gates for the second member were provided at positions overlapping with the through holes of the first member, and therefore the first member was less likely to receive the pressure derived from injection molding and was less likely to deform.

Example 5

In the description below, evaluations of a composite gear of Example 5 having the configuration of FIGS. 10A and 10B, the composite gear of Example 1 described above, and the conventional composite gear of Comparative Example 2 described above will be described.

Table 5 shows results of comparison between the composite gear of Example 5 having the configuration of FIGS. 10A and 10B, the composite gear of Example 1 described above, and the conventional composite gear of Comparative Example 2 described above. Although the material of each component and specifications of the gear of Example 5 were the same as those of Example 1 described above, corner parts of the through holes of the first member particularly on the inner peripheral side were formed to have curved shapes such as cylindrical surface or chamfered surfaces as illustrated in FIGS. 10A and 10B. Table 5 shows results of analysis performed on computer-aided design models: CAD models of the composite gears of Comparative Example 2 and Examples 1 and 5 on the maximum principal stress [MPa] generated in the first member when the composite gears are rotationally driven at a torque of 0.1 N·m.

TABLE 5

|  | Comparative Example 2 | Example 1 | Example 5 |
|---|---|---|---|
| Material | PBT + POM | PBT + POM | PBT + POM |
| Curved corner | No | No | Yes |
| Maximum principal stress [MPa] | 0.63 | 0.94 | 0.55 |

Figure 17:
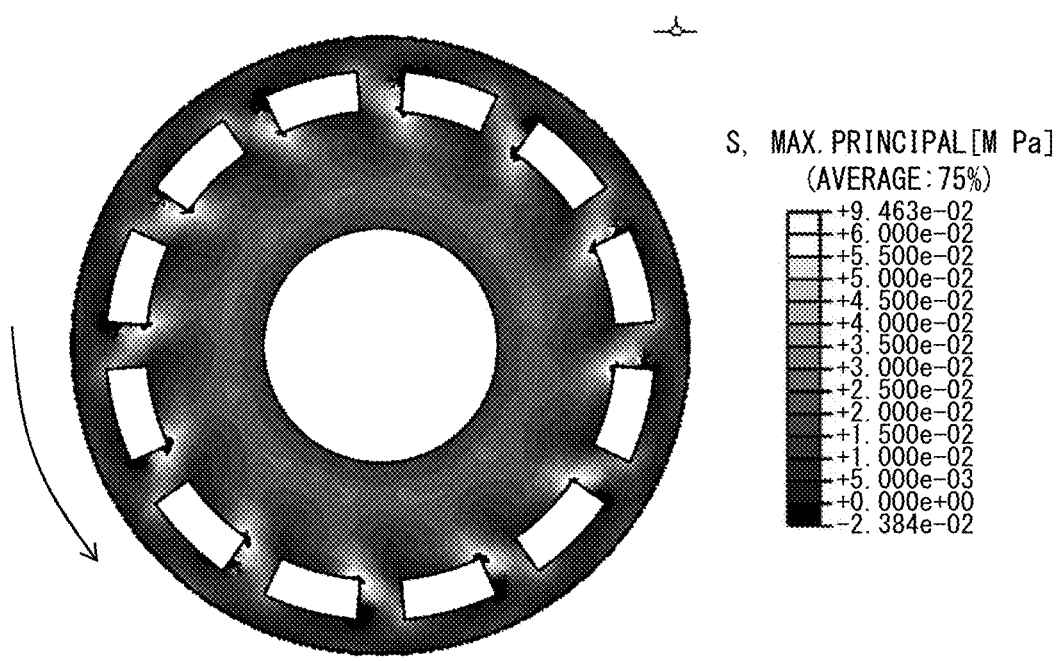
FIG. 17 is an explanatory diagram illustrating a distribution of stress generated at the time of rotational driving of the composite gear according to the exemplary embodiment.

Comparing Comparative Example 2 corresponding to the conventional configuration with Examples 1 and 5, higher principal stress is generated in Example 1 than in Comparative Example 2, but lower principal stress is generated in Example 5 than in Comparative Example 2. Here, FIG. 17 shows results of analysis of Example 1 and illustrates a distribution of stress generated in the first member when a torque is applied to the composite gear in a counterclockwise direction. As illustrated in FIG. 17, it can be seen that high stress is generated at corner parts of the through holes. This is a so-called notch effect, and there is a tendency that stress is concentrated on portions such as the corner parts of the through holes of Example 1. However, by just forming the corner parts of the through holes, where stress is likely to concentrate, in curved shapes, for example, cylindrical surfaces or chamfered surfaces as in Example 5, that is, as illustrated in FIGS. 10A and 10B, the stress can be dispersed and the main principal stress can be reduced as shown in Table 5.

Example 6

In the description below, evaluations of the composite gear of Example 6 constituted as illustrated in FIGS. 11A to 11C and the composite gears of Example 1 and Comparative Example 2 described above will be described. Although the material of each component and specifications of the gear of the composite gear of Example 6 were the same as those of Example 1 described above, a ring-like protruding ridge d was provided on the outer peripheral portion of the inner web 55 of the first member 50 as illustrated in FIGS. 11A to 11C.

Table 6 shows results of comparison between the composite gear of Example 6 constituted as illustrated in FIGS. 11A to 11C and the composite gears of Example 1 and Comparative Example 2 described above. The evaluations were made on the endurance time [hr], which corresponded to the time elapsed after the composite gears of Comparative Example 2 and Examples 1 and 6 were charged and stored in high-temperature furnaces of 80° C. and 120° C. and before a crack occurred.

TABLE 6

|  |  | Comparative Example 2 | Example 1 | Example 6 |
|---|---|---|---|---|
| Material |  | PBT + POM | PBT + POM | PBT + POM |
| Ring-like protruding ridge |  | No | No | Yes |
| Endurance time [hr] | 80[° C.] | 1512 | 9530 | 13550 |
|  | 120[° C.] | 105 | 1120 | 1650 |

Comparing Comparative Example 2 corresponding to the conventional configuration with Examples 1 and 6, the endurance time was improved particularly in Example 6. This can be considered to be because the second member became less likely to be formed on the outer periphery of the first member as a result of providing the ring-like protruding ridge d on the outer periphery of the inner web of the first member of Example 6. Polyacetal resin was used for the second member in this example, and there is a tendency that, in normal injection molding, if there is a space of a size of about 10 μm, the resin flows into the space. Example 1 does not have the protruding ridge of Example 6, and there is a possibility that the first member itself shrank after the first member was formed and before the second member was formed, and a small gap was generated between the mold and the first member. In such a case, a small amount of the material of the second member flows into the gap around the outer peripheral portion of the first member. In the case where the second member is formed on the outer peripheral portion of the first member, the space for absorbing the shrinkage of the second member is reduced, therefore the shrinkage of the second member is hindered, and the endurance time against breakage such as cracks is shortened. However, in Example 6, the protruding ridge d illustrated in FIGS. 11A to 11C blocks this inflow, therefore the space for absorbing the shrinkage of the second member can be secured, and the endurance time against breakage such as cracks can be improved.

Example 7

In the description below, evaluations of a composite gear of Example 7 constituted as illustrated in FIGS. 20A and 20B and the composite gear of Example 1 described above will be described. In the composite gear of Example 7 illustrated in FIGS. 20A and 20B, although the material of each component and the specifications of the gear were the same as those of Example 1, the angle φ of the side edge portions of the through holes of the inner web was set to a larger value than in Example 1 as illustrated in FIGS. 20A and 20B. In other words, the ratio of the region where the through holes were provided in the peripheral direction was set to be higher than in Example 1.

Table 7 shows results of comparison between the composite gear of Example 7 constituted as illustrated in FIGS. 20A and 20B and the composite gear of Example 1 described above. The evaluations were made on the deformation of the inner web of the first member caused by molding of the second member, and correspond to results of analysis on the amount of deformation [μm] at the time when the injection was completed.

TABLE 7

|  | Example 1 | Example 7 |
|---|---|---|
| Material | PBT + POM | PBT + POM |
| Angle of side edge portions of through holes [°] | 16 | 22 |
| Deformation of inner web [μm] | 16.8 | 3.3 |

Comparing Example 1 with Example 7, deformation of the inner web was suppressed in Example 7. This is because pressure generated when molding the second member was relieved as a result of increasing the angle of the side edge portions. Although it can be considered that the rigidity of the web was lowered, it can be considered that the effect of the pressure relief was bigger than the effect of decrease in the rigidity.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2019-119939, filed on Jun. 27, 2019, and 2020-95174, filed on Jun. 1, 2020, which are hereby incorporated by reference herein in their entirety.

What is claimed is:

1. A composite gear comprising:
   a first member comprising a rotation shaft portion and a disk-shaped web extending in radial directions from the rotation shaft portion; and
   a second member comprising at least one engaging tooth on an outer periphery of the second member and provided being supported by the web so as to surround an outer periphery of the first member,
   wherein a first space is provided between the second member and an outermost peripheral surface of the first member in a radial direction,
   wherein a second space is provided between the first member and an innermost peripheral surface of the second member in a radial direction, and
   wherein one of the first member and the second member is formed to nip another of the first member and the second member from both sides of the other of the first member and the second member in an axial direction of the rotation shaft portion.

2. The composite gear according to claim 1, wherein the second member comprises a nipping portion configured to nip a part of the first member from both sides of the first member in the axial direction, and the outermost peripheral surface of the first member is exposed to the first space.

3. The composite gear according to claim 1, wherein the second member comprises a nipping portion configured to nip a part of the first member from both sides of the first member in the axial direction, and wherein the part of the web nipped by the nipping portion is formed such that a thickness of the part of the web in the axial direction gradually decreases in a direction from an outer periphery of the web toward the rotation shaft portion.

4. The composite gear according to claim 1,
   wherein a through hole penetrating through in the axial direction is provided in the web of the first member,
   wherein the second member is formed to penetrate through the through hole,
   wherein the second member is formed to be integrated with the first member by injecting a resin material through a gate onto the first member, and
   wherein a gate trace of the gate is provided at a position of the through hole of the first member.

5. The composite gear according to claim 1, wherein a protruding ridge is formed on an outer periphery of the web of the first member, and
   wherein the first member is formed from polyacetal, polybutylene terephthalate, polyphenylene sulfide, polyamide, or nylon.

6. The composite gear according to claim 1,
   wherein the other of the first member and the second member comprises a through hole comprising two side edge portions opposing each other in a rotation direction about the rotation shaft portion, and
   wherein the one of the first member and the second member is formed to penetrate through the through hole.

7. The composite gear according to claim 6, wherein the side edge portions each extend linearly as viewed in the axial direction, and has an inclination angle within a range of −10° to +10° with respect to a radial direction of the rotation shaft portion.

8. The composite gear according to claim 7, wherein the through hole is provided in the first member and is defined by the two side edge portions, an outer edge portion interconnecting the two side edge portions on an outer peripheral side of the through hole, and an inner edge portion interconnecting the two side edge portions on an inner peripheral side of the through hole.

9. The composite gear according to claim 8, wherein the outer edge portion and/or the inner edge portion has a curved shape.

10. The composite gear according to claim 8, wherein the side edge portions, the outer edge portion, and/or the inner edge portion are interconnected via a corner part having a curved shape.

11. The composite gear according to claim 10, wherein the curved shape of the corner part is a cylindrical surface or a chamfered surface.

12. The composite gear according to claim 6, wherein an angle φ [deg] formed by the two side edge portions of the through hole satisfies the following, $$15 - \sqrt{225 - \frac{l^4}{8t^2}} \leq \Phi \leq 15 + \sqrt{225 - \frac{l^4}{8t^2}}$$

where l [mm] represents a distance between the outermost peripheral surface of the first member and an outer edge portion of the through hole, and t [mm] represents a thickness of the web of the first member.

13. The composite gear according to claim 1, wherein the first member comprises a nipping portion configured to nip a part of the second member from both sides of the second member in the axial direction.

14. The composite gear according to claim 1, wherein the first member comprises a first nipping portion configured to nip a part of the second member from both sides of the second member in the axial direction, and the second member comprises a second nipping portion configured to nip a part of the first member from both sides of the first member in the axial direction.

15. A cartridge for an image forming apparatus, the cartridge comprising:
   a photosensitive drum; and
   the composite gear according to claim 1 configured to be attached to an end portion of the photosensitive drum in a longitudinal direction of the photosensitive drum and transmit a rotational force to the photosensitive drum.

16. An image forming apparatus comprising:
   the cartridge according to claim 15; and
   an image forming mechanism configured to form an image by using the photosensitive drum of the cartridge.

17. The composite gear according to claim 1, wherein the first member is formed from a first resin material, the second member is formed from a second resin material, and the first resin material has a higher rigidity than the second resin material.

18. The composite gear according to claim 1, wherein a shape of the outer periphery of the first member is closer to a circle than a shape of the outer periphery of the second member is.

19. A mold for manufacturing a composite gear,
   wherein the composite gear comprises:
      a first member comprising a rotation shaft portion and a disk-shaped web extending in radial directions from the rotation shaft portion; and a second member comprising at least one engaging tooth on an outer periphery of the second member and provided being supported by the web so as to surround an outer periphery of the first member, wherein a first space is provided between the second member and an outermost peripheral surface of the first member in a radial direction, wherein a second space is provided between the first member and an innermost peripheral surface of the second member in a radial direction, wherein one of the first member and the second member is formed to nip another of the first member and the second member from both sides of the other of the first member and the second member in an axial direction of the rotation shaft portion, wherein the mold comprises a first fixed mold, a second fixed mold, and a movable mold, wherein the first member is molded in a state in which the movable mold opposes the first fixed mold, and wherein the second member is molded to be integrated with the first member in a state in which the movable mold has moved to a position opposing the second fixed mold after the first member has been molded.

20. A manufacturing method for a composite gear, the manufacturing method comprising:

a first step of forming a first member comprising a rotation shaft portion and a disk-shaped web extending in radial directions from the rotation shaft portion; and a second step of accommodating the first member formed in the first step in a mold and forming a second member comprising at least one engaging tooth on an outer periphery of the second member such that the second member is supported by the web and surrounds an outer periphery of the first member, wherein, in the second step, the second member is formed such that a first space is provided between the second member and an outermost peripheral surface of the first member in a radial direction, a second space is provided between the first member and an innermost peripheral surface of the second member in a radial direction, and one of the first member and the second member is formed to nip another of the first member and the second member from both sides of the other of the first member and the second member in an axial direction of the rotation shaft portion.

* * * * *